United States Patent
Bouttier

(10) Patent No.: US 11,722,348 B2
(45) Date of Patent: Aug. 8, 2023

(54) HYBRID REFERENCE SIGNAL WITH LOW PAPR FOR DFT-S-OFDM

(71) Applicant: MITSUBISHI ELECTRIC CORPORATION, Tokyo (JP)

(72) Inventor: Arnaud Bouttier, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 21 days.

(21) Appl. No.: 17/639,520

(22) PCT Filed: Oct. 20, 2020

(86) PCT No.: PCT/JP2020/040026
§ 371 (c)(1),
(2) Date: Mar. 1, 2022

(87) PCT Pub. No.: WO2021/090716
PCT Pub. Date: May 14, 2021

(65) Prior Publication Data
US 2022/0294680 A1 Sep. 15, 2022

(30) Foreign Application Priority Data
Nov. 5, 2019 (EP) .................................... 19306433

(51) Int. Cl.
*H04L 27/26* (2006.01)
*H04J 13/00* (2011.01)
(52) U.S. Cl.
CPC ...... *H04L 27/2636* (2013.01); *H04J 13/0062* (2013.01); *H04L 27/2607* (2013.01); *H04L 27/2613* (2013.01)
(58) Field of Classification Search
None
See application file for complete search history.

(56) References Cited

U.S. PATENT DOCUMENTS

| 2014/0029589 A1 | 1/2014 | Muharemovic et al. |
| 2019/0097859 A1 | 3/2019 | Bala et al. |

FOREIGN PATENT DOCUMENTS

| JP | 2019-514270 A | 5/2019 |
| WO | WO 2008/114956 A1 | 9/2008 |

OTHER PUBLICATIONS

International Search Report for PCT/JP2020/040026 dated Feb. 1, 2021.

(Continued)

*Primary Examiner* — Hong Shao
(74) *Attorney, Agent, or Firm* — Birch, Stewart, Kolasch & Birch, LLP

(57) ABSTRACT

A radio signal is provided by:
  determining a first position J1 and a second position J2 in a block of K samples;
  applying a DFT-spread-OFDM-type scheme to the block, and obtaining an output signal representing a symbol comprising N complex samples Sn in the radio signal;
  determining, in the output signal, a first position T1 and a second position T2;
  inserting, between the first position T1 and the second position T2 of the updated output signal, S reference samples and L cyclic prefix samples, to obtain a subsequent signal representing a hybrid symbol comprising a data section and a reference section;
  appending, to the hybrid symbol, a cyclic prefix of at least part of the hybrid symbol to obtain a signal representing the hybrid symbol appended with the cyclic prefix; and
  emitting the radio signal corresponding to the signal representing the hybrid symbol appended with the cyclic prefix.

18 Claims, 4 Drawing Sheets

(56) References Cited

OTHER PUBLICATIONS

Sahin et al., "An Improved Unique Word DFT-Spread OFDM Scheme for 5G Systems", 2015 IEEE Globecom Workshops (GC WKSHPS), IEEE, Dec. 6, 2015, total 6 pages.
Written Opinion of the International Searching Authority for PCT/JP2020/040026 dated Feb. 1, 2021.
Indian Office Action for corresponding Indian Application No. 202247009126, dated Jul. 1, 2022, with English translation.
Japanese Office Action and Search Report for Japanese Application No. 2022-532241, dated Feb. 28, 2023, with English translation.

HYBRID REFERENCE SIGNAL WITH LOW PAPR FOR DFT-S-OFDM

TECHNICAL FIELD

The present invention generally relates to the telecommunication domain, and more specifically to the incorporation of symbols like reference signals in the context of communications using OFDM-based (Orthogonal Frequency Division Multiplexing) transmission schemes.

More particularly, DFT-spread-OFDM modulation is used to implement the uplink transmissions in 3GPP/LTE networks under the acronym of SC-FDMA (Single Carrier Frequency Division Multiple Access). It is also part of the new radio (NR) standard of the 5G system under specification at the 3GPP standardization body. This modulation is also standardized to implement the satellite component of the DVB-NGH system hybrid profile under the acronym of SC-OFDM (Single Carrier-Orthogonal Frequency Division Multiplexing).

BACKGROUND ART

Two main technologies are used to achieve wireless transmissions:
The time Division Multiplexing (TDM) also called Single Carrier (SC) modulations, and
The Orthogonal Frequency Division Multiplexing (OFDM) modulations.

In the first case, the information is transmitted as a stream of M-ary symbols, at the so-called baud rate (1/T Hertz), shaped with a time waveform to reduce the spectrum occupancy. These modulations are generally linear modulations in amplitude and phase. It is also possible to modulate signals in frequency but this approach is not described here. In order to simplify the receiver, one may limit the duration of the waveform to the symbol period T of the signal. Unfortunately, this would lead to a far too large spectral occupation. Nothing prevents from relying on waveforms with much a longer time support, but this requires in general the use of more complex receivers. It is actually possible to limit the spectral occupancy while keeping the capacity to sample the received signal at the baud rate as long as the waveform regularly goes to zeros every period T. This is the case for instance with the so-called square root raised cosine (SRRC) filter. The main constraint is then to achieve a very accurate time synchronization (sampling when the eye diagram closes). This description holds in baseband. Obviously, the signal can be transposed in whatever frequency band through zero-IF or super-heterodyne modulation. A SC signal can be described as follows:

$$\bar{y}(t) = \sum_{k=0}^{M-1} \text{Re}\{x_k g(t - kT) e^{2j\pi f_0 t}\},$$

where $f_0$ is the carrier frequency, T the symbol period, g(t) the signal waveform with finite energy—typically a square root raised cosine (SRRC) filter, and $\{x_k\}$ a sequence of M discrete symbols carrying the information bits. The use of constellation alphabets with no or low amplitude variations (typically a Phase Shift Keying (PSK) alphabet) leads to modulated signals with low power envelope fluctuations directly related to the sharpness of the filtering in the frequency domain (roll-off for SRRC filters, from 0 to 100%). The power fluctuations are often described in terms of Peak to Average Power Ratio (PAPR), a metric used to quantify the envelope excursions of a signal v(t) over a time interval τ:

$$PAPR(v(t)|_{t \in \tau}) = \frac{\max_{t \in \tau} |v(t)|^2}{E\{|v(t)|^2_{t \in \tau}\}} \Bigg|_{dB}.$$

The PAPR represents the ratio of the maximum instantaneous peak power to the average power of the signal over the observation period τ, and is usually expressed in dB. Thanks to a low PAPR, SC transmitters can drive their power amplifier with low input back-offs (IBO) leading to a direct benefit in terms of power efficiency. Conversely, the filtering of symbols at a high speed makes it difficult to compensate for the frequency selectivity of the transmission channel. As soon as the channel power delay profile significantly exceeds the symbol period duration, the demodulation of SC signals requires rather complex inverse filters with a high number of taps for removing the inter-symbol interference (ISI). SC signals are widely used in satellite communication because the transmission channel is most of the time merely flat in frequency but also because it is strongly advised to operate the on-board high power amplifier (HPA) close to the saturation point (i.e. low IBOs) in order to save power.

The second and by far the most popular modulation technique is today the Orthogonal Frequency Division Multiplexing (OFDM) modulation. The principle is fairly simple: instead of modulating a single carrier at a high rate (the occupied bandwidth is defined by the baud rate) it is also possible to modulate several adjacent sub-carriers, hereinafter K adjacent sub-carriers, at a much lower rate. Doing so, it is even possible to use finite length waveforms (thus with a large support in the frequency domain) such as the rectangular window with duration T. As long as the baud rate for each individual sub-carrier is much longer than the channel delay spread, the channel in the frequency domain appears as merely flat over each sub-carrier. In other words, the effect of the channel can easily be compensated for each sub-carrier from a simple complex amplitude scaling. What wakes the OFDM modulation so attractive is the possibility to interleave the sub-carriers every 1/T Hertz as the contribution of all the adjacent sub-carriers cancels out to zero at the output of the rectangular matched filter with length T seconds (AWGN channel assumption).

The second reason for the wide scale use of the OFDM modulation lies in its ease of implementation. It can easily be shown that the sampling version of the true analogue OFDM signal can be obtained by simply computing the Inverse Discrete Fourier Transform (IDFT) on the K samples to be transmitted after adding P null sull-carriers on both edges of the sub-carrier multiplex (here N=K+2×P). The IDFT simply generates an oversampled version of the ideal analogue OFDM signal, i.e. with aliasing. The more null sub-carriers are added, the better the quality of the sampling is. In practice, in order to reduce the computation burden, the number of null sub-carriers is limited to just allow for applying the first oversampling filtering before digital to analogue conversion without introducing too much in band ripple. The spectrum occupancy of the OFDM modulation is indeed an intrinsic weakness of the modulation and the occupied bandwidth is typically reduced using sharp analogue filters. An OFDM signal is defined in basedband as:

$$y(t) = \sum_k \sum_{n=0}^{N-1} x_k^{(n)} \prod_{[0,T]} (t-kT) e^{2j\pi \frac{nt}{N}},$$

where Π(t) is a rectangular window, equal to one in the time interval [0, T], zero elsewhere. It can be shown that the detection can be achieved independently on a symbol basis both in the time (OFDM symbol level) and frequency (sub-carrier level) domains. The so-called sub-carrier orthogonality brings another advantage: even with a finite length waveform such as the rectangular waveform, the OFDM modulation achieves a rather good spectral efficiency, actually similar to the one of an SC modulation with a zero roll-off waveform.

In practice, the symbol period cannot be made arbitrarily long as it would become impossible to separate the sub-carriers due to phase noise or Doppler spread for a time-varying channel. Instead, symbols are generally transmitted with a guard interval (GI) fed as a cyclic prefix (CP) meant to "swallow" Inter-Symbol Interference (ISI) between consecutive symbols. Thanks to the cyclic prefix, the linear convolution of the received signal with the channel impulse response appears as a circular convolution, the basic assumption for performing filtering in the DFT domain. It is just as if the channel had been applied in the DFT domain (the signal is assumed to be periodic). The discrete channel can thus be accurately estimated in the frequency domain by simply dividing the received sub-carriers by reference sub-carriers known in advance at the receiver (i.e. the duality—convolution in time, division in frequency—is satisfied). Much in the same way, the channel impact can also be retrieved in the frequency domain by simply dividing the received sub-carriers by the estimated channel coefficients (one-tap equalization). The CP is also useful to alleviate the impact of jitter on time synchronization by simply positioning the demodulation FFT window a few samples back in the CP.

As the sum of many independent signals, an OFDM signal rapidly behaves as a random Gaussian noise with rather important envelope fluctuations. To avoid any detrimental effects on the receiver performance, one shall apply a back-off of about 15 to 17 dBs with respect to the mean power when saturating the amplitude of an OFDM signal. With that respect, OFDM is clearly less suited than SC modulations when it comes to save power through the application of low power amplifier IBOs. This is where the DFT-spread-OFDM modulation builds a bridge between single-carrier (SC) and multiple-carrier (MC) solutions. In the DFT-spread-OFDM modulation, the constellation samples are first spread in frequency by means of a DFT. After addition of null sub-carriers at the two band edges, the spread symbols are OFDM modulated to obtain a signal with the expected spectral shape. It is obvious that with the combination of a DFT for spreading and an IDFT for modulation, the resulting signal is more or less a copy of the original samples. As a matter of fact, the resulting signal is simply the sampled version of the original samples that would be filtered out with the Dirichlet waveform, the Discrete Time Fourier Transform (DTFT) of a discrete rectangular window. This is actually the principle of the well-known FFT or Fourier oversampling algorithm. From the above description, it appears that the DFT-spread-OFDM modulation can be interpreted as an alternative to basic time domain filtering to implement the generation of a SC signal. There is however a major difference between the two approaches: due to the circularity of the DFT convolution, the first and last samples over each OFDM symbols are correlated to each other over a number of several N/K samples (the first significant lobes of the Dirichlet waveform).

As for any OFDM signal, the demodulation of the DFT-spread-OFDM modulation can intrinsically be achieved in the frequency domain by means of a low complexity one-tap equalizer. It can be shown that the receiver architecture is merely the same as for an OFDM receiver at the notable exception of an additional IDFT to recover the transmitted samples.

Reference symbols need to be defined to allow for channel estimation for the DFT-spread OFDM modulation.

As previously mentioned, the OFDM modulation is particularly well suited for frequency selective channels as the impact of the channel can readily be retrieved by means of a simple one-tap equalizer over each sub-carrier, whatever the selectivity of the channel (as long as it remains constant over the symbol duration). A fundamental step is to first estimate the channel coefficients over all the data sub-carriers. The channel is generally estimated using reference symbols (RS) also called pilots known at the receiver. In OFDM, reference symbols are commonly generated through the insertion of samples known at the receiver on some or all of the modulated sub-carriers. The basic approach for estimating the channel in OFDM involves performing:

a channel estimation at the pilot positions,
a frequency domain smoothing, and
a time interpolation.

In OFDM, it is possible to adjust the ratio data/pilot according to the channel properties in both the frequency and time domains. For instance, if the channel coherence bandwidth is very high but the channel changes rapidly, it is possible to insert only a few pilots in the frequency domain (1 pilot every γ sub-carriers) but regularly spaced in time. It is even possible to change the position of the so-called scattered pilots from time to time, such as the PPx symbols in the DVB-T2 systems. This is clearly one the main advantages of the OFDM modulation over SC modulations.

If the DFT-spread-OFDM modulation benefits from its OFDM lineage for the equalization, it is less the case for the insertion of pilots. Indeed, the low power fluctuations of its envelope result from the OFDM modulation of DFT-spread symbols. Any arbitrary alteration of the spread sub-carriers through for instance the direct insertion of reference sub-carriers would break the PAPR properties of the signal (the same holds in case of insertion after puncturing of the spread samples). For that reason, the 3GPP/LTE uplink system specifies a full pilot, i.e. all the sub-carriers of the OFDM symbol carry reference pilots, directly inserted in the frequency domain as a Zadoff-Chu sequence. Zadoff-Chu sequences have constant amplitude and remain Zadoff-Chu sequences after DFT for some sets of parameters. The transmitted pilot thus keeps the good PAPR properties of a SC signal.

In order to reduce the pilot overhead, the DVB-NGH system specifies a pilot called PP9 that combines data and reference information (hereafter called hybrid pilot symbol). Data are obtained by applying a spreading DFT over a block of data with a length equal to half the size of the regular DFT. Then, spread data are interleaved in frequency one every two sub-carriers along with a Zadoff-Chu sequence. For each component of the reference symbol (data and pilots), the resulting signal is simply the oversampled version of two consecutive copies of the original half-length sequence. As the sum of two SC signals, the resulting signal is no more a pure SC signal. In DVB-NGH, the two signals are added with a time shift of half a sample duration in order to reduce the envelope fluctuations. This leads to a reference symbol with fairly good PAPR properties. With an equal ratio of data and pilot samples, the PP9 RS of the DVB-NGH is especially well suited for channels with a small coherence bandwidth, i.e. severely distorted in frequency.

The principle of another pilot scheme denoted as Time Division Multiplex Pilot (TDMPi) is depicted on FIG. 1. In this scheme, the reference symbol is modulated like any other DFT-spread-OFDM symbol. The vector of samples to be transmitted is divided into two parts: the first part contains a given number of reference samples known at the receiver while the second part contains information data. The quantity of reference samples is typically selected according to the coherence bandwidth of the channel. The principle is here to generate a symbol that contains a predefined pattern to be used by the receiver as a short OFDM symbol. However, due to the circular convolution applied by the DFT-spread-OFDM modulation, the modulated samples in the front part of the reference symbol not only depends on the reference samples but also on the adjacent samples on the right hand side of the reference samples and the last samples in the vector by circularity.

In order to reduce the interference of the data onto the pilots, the TDMPi scheme modulates separately the pilot and information data and the contribution of the information data samples onto the pilot part is zeroed before adding the two modulated vectors (the DFT-spread-OFDM modulation is linear). A key advantage of this approach is that the zeroing operation does not alter the envelope of the generated signal. The reference symbol thus keeps the good PAPR properties of the DFT-spread-OFDM modulation whatever the length of the front part. Another key feature of the TDMPi scheme is the insertion of a cyclic prefix not related to the overall symbol but to the font part. Doing so, the receiver is able to estimate the channel from the front part of the reference symbol that closely resemble to a regular OFDM symbol including its CP.

This scheme is specifically designed for the context of satellite transmissions where the channel is in general merely flat and slowly changes with time. The rationale is thus to enable for an accurate channel estimation from a few reference symbols at the expense of a slight degradation in performance for the demodulation of the data carried by the reference symbol. The demodulation of those data suffers from two detrimental effects: the destruction of the orthogonality of the OFDM modulation due to the zeroing operation and the lack of circularity due to the replacement of the global CP by the pilot CP (PCP) covering the front samples to serve as a small OFDM reference symbol. As a matter of fact, the degradations are particularly significant at the two edges of the data parts.

Another limitation of the TDMPi pilot scheme relates to the lack of circularity for the overall symbol (PCP instead of CP). In case the demodulation FFT window is positioned a few samples back in the CP, then the signal contains no information for the demodulation of the last samples of the data part. This is fairly common in contexts other than satellite transmissions to apply a shift in the CP by up to half its length in order to avoid synchronization issues and to reduce some imperfections in the channel estimation due to a lack of knowledge on its accurate power delay profile.

There is a need to define hybrid reference symbols, also known as pilots, having a low PAPR to allow for channel estimation in DFT-spread-OFDM modulation. This modulation is mostly used in contexts where it is required to save power by driving power amplifiers close to the saturation such as satellite transmissions. It is thus required to rely on signals that show low power fluctuations including for the reference symbols. The construction of reference symbols with a low PAPR is more complex than in OFDM as any alteration of the signal can significantly degrade its power envelope. To benefit from a low PAPR, existing solutions either exhibit a fixed and high ratio of pilot samples over data or require arbitrating between channel estimation and embedded data demodulation quality.

As explained before, the TDMPi reference symbol is particularly well suited for contexts such as satellite transmissions where a key requirement is to minimize the insertion of reference symbols to save at most power at the satellite while keeping low the PAPR. This is the main reason for replacing the normal CP by the pilot CP instead of devoting specific samples for building a dedicated CP for the pilot pattern. As a side effect, the receiver may lack of information for demodulating the last samples in the symbols in case the FFT window is positioned a few samples back in CP. Also, unlike for a global CP, there is no amplitude continuity at the junction between the end of the PCP and the beginning of the DFT-spread-OFDM symbol. This is source of out-of-band (OOB) radiations that may be reduced by filtering but at the expense of a degradation of the circularity for the small OFDM symbol. A solution would be to add reference samples at the end of the symbol but at the cost of a degraded spectral efficiency.

SUMMARY OF INVENTION

The present invention aims at improving the situation.

To that end, the invention relates to a method for transmitting at least a group of Kd data samples in a radio signal to be transmitted over a communication system, said radio signal being intended to be emitted by an emitter comprising at least one transmission module configured for transmitting on at least a number of K different sub-carriers, K and Kd being strictly positive integers, Kd being strictly smaller than K, said radio signal being provided by:

determining a first position J1 and a second position J2 in a block of K samples $(A_0; \ldots; A_{K-1})$, such that the block of K samples comprises:
Kd data samples to be transmitted;
and K0 consecutive samples $(A_{J1}; \ldots; A_{J2})$;
with J2−J1+1=K0 and Kd+K0=K;

applying a DFT-spread-OFDM-type scheme to the block of K samples $A=(A_0; \ldots; A_{K-1})$, and obtaining an output signal representing a symbol comprising N complex samples $S_n$ in the radio signal, with n=0 to N−1;

determining, in the output signal, a first position T1 and a second position T2 based on J1, J2, K and N such that: T2−T1=R, with R being a strictly positive integer;

setting, in the output signal, the values of the R complex samples $(S_{T1}; \ldots; S_{T2})$ between the first position T1 and the second position T2 to zero to obtain an updated output signal;

inserting, between the first position T1 and the second position T2 of the updated output signal, S reference samples, S being a strictly positive integer and R=S+L, with L being a positive or null integer, to obtain a subsequent signal representing a hybrid symbol comprising:
for each of n=[0; T1−1]∪[T2+1; N−1], a complex sample $S_n$ in the radio signal, the complex samples forming a data section of the hybrid symbol;

for each of n=[T1+L; T2], a reference sample $RS_n$ in the radio signal, the reference samples forming a reference section of the hybrid symbol;

appending, to the hybrid symbol, G samples forming a cyclic prefix of at least part of the hybrid symbol to obtain a signal representing the hybrid symbol appended with the cyclic prefix; in view of transmitting the radio signal corresponding to the signal representing the hybrid symbol appended with the cyclic prefix.

By communication system is understood a wireless communication system or a wired communication system. By transmission module is understood either a transmission antenna in the case of a transmission of the radio signal over a wireless communication system or a wired transmission interface in the case of a transmission of the radio signal over a wired communication system.

By data samples to be transmitted are understood information samples that are to be included in the radio signal to be transmitted. By hybrid symbol is understood a symbol comprising both data samples and reference samples. By reference samples are understood samples known at the receiver to be used for demodulation purposes such as channel estimation but also synchronization, etc.

By DFT-spread-OFDM-type scheme is understood a signal modulation of the type of DFT-spread-OFDM. DFT-spread-OFDM-type schemes apply to signal modulation according to any existing or future standard or system relying on the DFT-spread-OFDM modulation (DVB, 3GPP, etc.). Applying a DFT-spread-OFDM scheme may be interpreted as oversampling the original samples of the block of K samples, with a ratio N/K. In other words, the modulated signal comprises N/K times the original number Kd of samples. If N/K is an integer, then the original Kd samples are directly found in the radio signal to be transmitted.

By "G samples forming a cyclic prefix of at least part of the hybrid symbol" is typically understood a substantially identical copy of the last portion of said hybrid symbol. Depending on the values of G, T1 and T2, the cyclic prefix of the hybrid symbol may comprise at least part of the data section of the hybrid symbol and/or at least part of the reference section of the hybrid symbol.

Replacing original samples in a DFT-spread-OFDM data symbol by:
zeroing the corresponding portion of the modulated signal; and
inserting a vector of reference samples, is equivalent to overwriting the contribution of said original samples. The indices T1 and T2 identify the positions of these original samples.

Thus, the N-R data samples are arranged in a comb structure by application of the DFT-spread-OFDM-type scheme, while the low power fluctuations of single-carrier modulations are preserved even though the N-R data samples are multiplexed with S reference samples, forming the hybrid symbol, as long as the reference samples are also generated to show a low PAPR.

In an embodiment, inserting, between the first position T1 and the second position T2 of the updated output signal, S reference samples to obtain the subsequent signal further comprises inserting, between the first position T1 and the second position T2, L cyclic prefix samples such that the subsequent signal comprises for each of n=[T1; T1+L−1], a cyclic prefix sample $CPRS_n$ in the radio signal, the cyclic prefix samples forming a cyclic prefix of the reference section of the hybrid symbol.

As an example, the inserted S+L samples forming the reference section of the hybrid symbol may correspond to a true OFDM pilot protected by its own cyclic prefix, in which case the S reference samples of such hybrid symbol allow benefiting from the efficiency and robustness of the OFDM modulation for estimating the channel.

In addition, the structure of the hybrid symbol in the radio signal to be emitted allows adjusting the ratio of the S reference samples over the N total samples after application of the DFT-spread-OFDM-type scheme (or equivalently the proportion of Kd data samples and K0 reference samples over the total number K of samples to be modulated) without changing the structure of the transmitted signal. It also allows defining a specific position for inserting the S reference samples. Indeed, it may be desirable to provide a radio signal having a predefined reference-to-data ratio, in accordance to a requirement of a channel in terms of coherence bandwidth. It may also be desirable that the reference subsection is in a position known by the receiver, for example a default position, so that the receiver may for example be able to demodulate only the reference subsection of the hybrid symbol to perform a channel estimate without the need to demodulate the whole hybrid symbol.

In order to provide a radio signal matching these additional requirements, it is possible to determine the first position J1 in the block of K samples such that the position T1 from which the S reference samples are inserted matches a target position and to determine the second position J2 in the block of K samples such that the ratio of the S reference samples over the K0 data samples match a target ratio.

It is to be noted that the S reference samples need to be generated with similar spectral properties to the signal obtained from the modulation of the Kd data samples by applying the DFT-spread-OFDM-type scheme to the block of K samples. In order to facilitate the estimation of the channel, it is proposed here to generate it as an OFDM signal. With respect to the objective of generating a reference symbol with low power envelope fluctuations, it is also preferable to generate the S reference samples in order to avoid as much as possible degrading the PAPR. As previously explained, the OFDM modulation is not specifically suited for generating low-PAPR signals. It is however possible, especially for reference signals, to keep low the power fluctuations through a careful selection of the samples to be modulated.

A typical example, though not exclusive, are the Zadoff-Chu sequences. Any other type of sequence but also modulation scheme can be selected as long as it enables the estimation of the channel and shows a low PAPR.

The advantages of inserting a true OFDM pilot with low PAPR protected by its own cyclic prefix are:
that the radio signal to be emitted shows low power fluctuations both for the data samples and for the reference samples, which is particularly desirable in contexts where it is required to save power by driving power amplifiers close to the saturation such as satellite transmissions,
that the demodulation of the OFDM pilot at the receiver may benefit from an accurate estimation of the channel used for transmitting the radio signal using any of the several available OFDM channel estimation techniques,
that the thusly constructed hybrid symbol may comprise any proportion of reference samples while keeping the same number of samples as any other symbol carried in the signal to be emitted, which allows transmitting one or more thusly constructed hybrid symbols together with data symbols, for example according to an LTE radio frame structure consisting, in the time domain, of subframes made of OFDM symbols each having the same length.

In an embodiment, the predetermined reference samples are generated by applying an OFDM modulation on a CAZAC sequence, which may more specifically be a Zadoff-Chu sequence. The result of an OFDM-type scheme applied on a CAZAC sequence with some specific parameters, respectively a Zadoff-Chu sequence, is an oversampled version of another CAZAC sequence, respectively of another Zadoff-Chu sequence. In addition to good correlation properties, such sequences in a radio signal have low envelope variations, that is, a low PAPR. It is possible to construct reference samples to be modulated by applying an OFDM-type scheme to such sequences and then to be inserted as a reference subsection of the hybrid symbol with low computing complexity.

In an embodiment, the block of K samples comprises a front part of K1 consecutive samples with K1=J1 and a rear part of K2 consecutive samples with K2=K−J2 and K1+K2=Kd. In other words, J1 and J2 are defined such that J1 is different from 0 and J2 is different from K−1. As a result, in the hybrid symbol to be transmitted in the radio signal, the front part and the rear part are non-null, that is, the first and the last samples of the hybrid symbol are data samples. Alternately, K1 or K2 may be equal to 0, resulting in the first samples or the last samples of the hybrid symbol being reference samples.

Several embodiments are disclosed below. These embodiments differ in particular in the values held by the K0 consecutive samples between the first position J1 and the second position J2 in the block of K samples.

In an embodiment, the method further comprises setting the values of the K0 consecutive samples between the first position J1 and the second position J2 in the block of K samples to zero, before applying the DFT-spread-OFDM-type scheme thereto and obtaining the output signal.

Setting the values of the K0 consecutive samples to zero is a simple and costless manner to obtain a suitable output signal in which the reference symbols are to be introduced. However, after applying the DFT-spread-OFDM-type scheme to a block of K samples comprising in the central part (between the first position J1 and the second position J2) K0 consecutive samples set to zero, the resulting output signal comprises in the central part (between the instants corresponding to the first position J1 and to the second position J2) non-zero symbols due to inter-sample interference resulting from the filtering effect of the modulation by applying the DFT-spread-OFDM-type scheme. Setting those symbols to zero results in an altered signal which no longer has the properties of an OFDM-type signal, and which may in particular reduce the quality of demodulation.

In an embodiment, at least part of the K0 consecutive samples in the block of K samples are obtained by, prior to applying the DFT-spread-OFDM-type scheme to the block of K samples and obtaining the output signal:

(a) obtaining a plurality of temporary blocks of K samples $(A'_0; \ldots; A'_{K-1})$, each temporary block of K samples comprising:
the Kd data samples to be transmitted, and
K0 temporary consecutive ghost samples $(A'_{J1}; \ldots; A'_{J2})$;

(b) for each temporary block of K samples, determining values of at least part of the R complex samples $S'_n$ for each of n=[T1; T2] to be obtained between the first position T1 and the second position T2 as a result of applying the DFT-spread-OFDM-type scheme to the temporary block of K samples;

(c) for each temporary block of K samples, determining a criterion associated to said temporary block of K samples indicating a level of resemblance between:
said values of at least part of the R complex samples $S'_n$, and
null values; and (d) determining said at least part of the K0 consecutive samples $(A_{J1}; \ldots; A_{J2})$ of the block of K samples based on values of each of said temporary blocks of K samples and on each criterion determined in (c), such that values of at least part of the R complex samples $S_n$ for each of n=[T1; T2] to be obtained between the first position T1 and the second position T2 as a result of applying the DFT-spread-OFDM-type scheme to the block of K samples exhibit an optimized level of resemblance to null values.

It is to be noted that according to this embodiment, the K0 temporary consecutive samples $(A'_{J1}; \ldots; A'_{J2})$ that are selected to obtain the K0 consecutive samples of the block of K samples are ghost samples, that is, samples which are involved in the generation of the signal to be transmitted, but which are not to be transmitted as samples per se, that is, as samples carrying information, contrary to the Kd data samples which carry useful data to be transmitted.

Due to the linearity of the DFT-spread-OFDM modulation, the criterion indicating the level of resemblance can be written as a linear system. In general, the system is over-determined. Thus the least-squares approach can be applied to compute the solution.

Throughout this document, the criteria may be any values relevant for algebraic or statistical methods for assessing a resemblance between a first dataset and a second dataset. Herein, the first dataset corresponds to the values of said at least part of the R complex samples $S'_n$ and the second dataset corresponds to null values. Said criteria may for example include for algebraic methods a L1 norm, a Euclidian distance (L2 norm), etc. and for statistical methods a mean value, a standard deviation, a weighted mean value, etc., of the R complex samples.

The sequence of (a), (b), (c), (d) above may be part of an algebraic or statistical method for determining optimized values of the K0 temporary consecutive samples. Examples of relevant statistical methods that may be used for this purpose include a least squares method, a weighted least squares method, a $\chi^2$ method, etc. . . . .

Throughout this document, determining said at least part of the K0 consecutive samples $(A_{J1}; \ldots; A_{J2})$ of the block of K samples may comprise solving a system of equations, such as a system of linear equations. Such system of linear equations typically comprises, for each potential solution (herein K0 temporary consecutive ghost samples $(A'_{J1}; \ldots; A'_{J2})$) a linear equation being a relationship between values associated to each sample of said potential solution and the value of the criterion associated to said potential solution. Such system of linear equations typically further comprises a linear equation being a relationship between the values of the solution to be determined and a value of the criterion associated to said solution to be determined being set to an optimized value (herein a value corresponding to a perfect resemblance of the solution to be determined with null values).

Solving such system does not necessarily correspond to finding an exact solution, herein exact values for said at least part of the K0 consecutive samples $(A_{J1}; \ldots; A_{J2})$ of the block of K samples.

Indeed, the system of linear equations is generally overdetermined. In such case, solving the system of linear equations results in determining said at least part of the K0 consecutive samples $(A_{J1}; \ldots ; A_{J2})$ of the block of K samples as the result of an algebraic transformation.

It is possible, if necessary by successive iterations, to determine the K0 consecutive samples in such a way that after modulation by applying the DFT-spread-OFDM-type scheme to the block of K samples, the contribution of the K0 consecutive samples tends to cancel out the contribution of the Kd data samples, such that the S'n symbols for each of n=[T1; T2] is close to zero.

Indeed, the thusly determined K0 samples generate a contribution over the positions [T1, T2] close to the opposite of the contribution of the data samples over the same portion of signal.

The main advantage of this approach is that setting to zero the contribution of data after modulation to all or part of the samples positions corresponding to the indices of the RSn reference samples for each of n=[T1; T2] generates less noise that may be detrimental for demodulation performance.

In an embodiment, determining said at least part of the K0 temporary consecutive samples comprises applying a least squares method.

Applying a least squares method allows setting values for the K0 temporary consecutive samples which minimize the Euclidian distance between the contribution of the K0 consecutive samples and the contribution of the Kd data samples after modulation.

In an embodiment, at least part of the K0 consecutive samples $(A_{J1}; \ldots ; A_{J2})$ in the block of K consecutive samples are ghost samples of a ghost pilot type. Ghost samples of a ghost pilot type, or ghost pilots, are samples used to generate a signal which part between [T1, T2], after modulation by applying the DFT-spread-OFDM-type scheme thereto, mimic the samples that are inserted after the zeroing. The term ghost relates to the fact that their direct contribution on the pilot part is erased. In some cases, it may be useful to know the ghost pilots at the receiver to compensate for their contribution to the data samples after demodulation. This is particularly true when the ghost pilots are generated solely from the samples S to be inserted without influence of the data samples.

In an embodiment, the at least part of the K0 consecutive samples $(A_{J1}; \ldots ; A_{J2})$ in the block of K consecutive samples are determined by, prior to applying the DFT-spread-OFDM-type scheme to the block of K samples and obtaining the output signal:
  obtaining a reference signal comprising the S reference samples to be inserted appended with the L cyclic prefix samples to be inserted,
  applying an inverse DFT-spread-OFDM-type scheme to the reference signal to obtain a demodulated reference signal comprising a block of K demodulated samples comprising K0 consecutive demodulated samples,
  and inserting at least part of the K0 consecutive demodulated samples in the block of K samples as ghost samples of a ghost pilot type forming the at least part of the K0 consecutive samples.

The advantage of this approach is that after modulation, the Sn symbols for each of n=[T1; T2] mimic the S reference samples and the L cyclic prefix samples to be inserted. The closer the Sn samples to the S reference samples, the less degradations the insertion will apply.

The reference signal may be obtained by setting to zero the values of any samples adjacent to the S reference samples to be inserted appended with the L cyclic prefix samples to be inserted. In this case, the reference signal only comprises reference samples.

Alternately, the reference signal may further comprise additional samples, adjacent to the S reference samples to be inserted appended with the L cyclic prefix samples, and having values different from zero. An example for obtaining such a reference signal is:
  applying a DFT-spread-OFDM-type scheme to a block of K samples comprising Kd data samples to be transmitted and K0 consecutive samples having values set to zero, and obtaining an output signal representing a symbol comprising N complex samples $S_n$ in the radio signal, with n=0 to N−1;
  setting, in the thusly obtained output signal, the values of the R complex samples $(S_{T1}; \ldots ; S_{T2})$ between the first position T1 and the second position T2 to zero to obtain an updated output signal;
  inserting, between the first position T1 and the second position T2 of the thusly obtained updated output signal, the S reference samples and the L cyclic prefix samples to obtain the reference signal.

It is to be noted that after modulation, the Sn symbols for each of n=[T1; T2] are slightly different from the S reference samples and the L cyclic prefix samples to be inserted after modulation so as to form the hybrid symbol.

Indeed, by applying the inverse DFT-spread-OFDM-type scheme to the reference signal, K demodulated samples are obtained. These K samples contain the total information originally present in the reference signal. Among these K demodulated samples, only K0 consecutive demodulated samples are kept, resulting in a loss of information. When modulating the block of K samples containing Kd data samples and the K0 consecutive demodulated samples, it is thus not possible to obtain exactly the Sn symbols for each of n=[T1; T2] as originally present in the reference signal. However, setting the values of the Sn symbols for each of n=[T1; T2] to zero then inserting the S reference samples and the L cyclic prefix samples leads to a subsequent signal that resembles the output signal and keeps similar properties with respect to demodulation performance and to the emission of Out-of-Band radiations. It is to be noted that in general, replacing modulated symbols by inserted OFDM symbols leads to an amplitude discontinuity which causes the emission of Out-of-Band radiations. In the embodiment described above, as the samples to be modulated are determined so that the modulated symbols to be replaced resemble the OFDM symbols to be inserted, the amplitude jump is minimized.

In an alternate embodiment, the at least part of the K0 consecutive samples $(A_{J1}; \ldots ; A_{J2})$ in the block of K consecutive samples are determined by, prior to applying the DFT-spread-OFDM-type scheme to the block of K samples and obtaining the output signal:
  (a) obtaining a plurality of temporary hybrid blocks of K samples $(A''_0; A''_{K-1})$, each temporary hybrid block of K samples comprising:
    the Kd data samples to be transmitted, and
    K0 temporary consecutive ghost samples $(A''_{J1}; \ldots ; A''_{J2})$ of a ghost pilot type;
  (b) for each temporary block of K samples, determining values of at least part of the R complex samples $S''_n$ for each of n=[T1; T2] to be obtained between the first position T1 and the second position T2 as a result of applying the DFT-spread-OFDM-type scheme to the temporary hybrid block of K samples;

(c) for each temporary hybrid block of K samples, determining a criterion associated to said temporary hybrid block of K samples indicating a level of resemblance between:
said values of at least part of the R complex samples $S''_n$, and
the values of at least part of the S reference samples to be inserted appended with the L cyclic prefix samples to be inserted; and
(d) determining said at least part of the K0 consecutive samples $(A_{J1}; \ldots; A_{J2})$ of the block of K samples based on said temporary hybrid blocks of K samples and on each criterion determined in (c), such that values of at least part of the R complex samples $S_n$ for each of n=[T1; T2] to be obtained between the first position T1 and the second position T2 as a result of applying the DFT-spread-OFDM-type scheme to the block of K samples exhibit an optimized level of resemblance to the values of the at least part of the S reference samples to be inserted appended with the L cyclic prefix samples to be inserted.

Here, each temporary hybrid block of K samples in (a) comprises K0 temporary consecutive ghost samples $(A''_{J1}; \ldots; A''_{J2})$ of a ghost pilot type as a candidate of an optimization problem which is solved in (d) according to any algebraic or statistical method such as presented above. The solution to the optimization problem is ghost samples of the ghost pilot type forming at least part of the K0 consecutive samples $(A_{J1}; \ldots; A_{J2})$ of the block of K samples.

Therefore, after modulation, the Sn symbols for each of n=[T1; T2] also mimic the S reference samples and the L cyclic prefix samples to be inserted.

In an embodiment, the method further comprises:
(e) obtaining a plurality of temporary block of K samples $(A'_0; \ldots; A'_{K-1})$, each temporary block of K samples comprising:
the Kd data samples to be transmitted, and
K0 temporary consecutive ghost samples $(A'_{J1}; \ldots; A'_{J2})$;
(f) for each temporary block of K samples, determining values of at least part of the R complex samples $S'_n$ for each of n=[T1; T2] to be obtained between the first position T1 and the second position T2 as a result of applying the DFT-spread-OFDM-type scheme to the temporary block of K samples;
(g) for each temporary block of K samples, determining a criterion associated to said temporary block of K samples indicating a level of resemblance between:
said values of at least part of the R complex samples $S'_n$, and
null values; and
(h) determining at least part of K0 consecutive samples based on values of each of said temporary blocks of K samples and on each criterion determined in (g), such that values of at least part of the R complex samples $S_n$ for each of n=[T1; T2] to be obtained between the first position T1 and the second position T2 as a result of applying the DFT-spread-OFDM-type scheme to the block of K samples exhibit an optimized level of resemblance to null values.
(i) based on said at least part of K0 consecutive samples determined in (h), updating said at least part of the K0 consecutive samples $(A_{J1}; \ldots; A_{J2})$ of the block of K samples.

Updating the K0 consecutive samples $(A_{J1}; \ldots; A_{J2})$ of the block of K samples may for example correspond to summing the values of each of the K0 consecutive samples $(A_{J1}; \ldots; A_{J2})$ of the block of K samples with the corresponding respective value of the K0 temporary consecutive ghost sample $(A'_{J1}; \ldots; A'_{J2})$ having the same indice.

Therefore, after modulation by applying the DFT-spread-OFDM-type scheme to the block of K samples, the contributions of the Kd data samples are compensated by the contributions of the K0 consecutive samples modified as such. Therefore the Sn symbols for each of n=[T1; T2] mimic more accurately the S reference samples and the L cyclic prefix samples to be inserted.

In an embodiment, updating the values of at least part of the K0 consecutive samples of the block of K samples comprises:
determining a third position J1+Pa1 and a fourth position J2-Pa2 in the block of K samples such that the K0 consecutive samples comprise:
a front part of Pa1 consecutive samples $(A_{J1}; \ldots; A_{J1+Pa1})$;
a central part $(A_{J1+Pa1+1}; \ldots; A_{J2-Pa2-1})$;
a rear part of Pa2 consecutive samples $(A_{J2-Pa2}; \ldots; A_{J2})$, Pa1, Pa2 being positive integers and Pa1+Pa2 being strictly inferior to K0,
and updating the values of the samples of the front part and of the rear part of the K0 consecutive samples.

Therefore, only the front part and the rear part of the K0 consecutive samples is updated. Such update is sufficient to reduce amplitude discontinuity between the data section and the first and last samples of the pilot section of the hybrid symbol. In particular, with regard to the signal properties with respect to demodulation performance and to the emission of Out-of-Band radiations which have already been addressed above, these signal properties may be optimized to a large extent by only updating the front part and the rear part of the K0 consecutive samples. Indeed, updating the central part of the K0 consecutive samples has a comparatively smaller impact on said properties. For example, the emission of Out-of-Band radiations is related to amplitude discontinuities, which are related to the replacement of the samples of the front part and of the rear part of the K0 consecutive samples by inserted samples such as OFDM samples.

In an embodiment, Pa1=Pa2 leading to a symmetric effect on the front and rear parts of the K0 samples.

Data zeroing the central part of the symbol after modulation, and inserting the OFDM pilot in the central part of the symbol to form the pilot section of the hybrid symbol both may lead to degradations at the receiver. Such degradations may be minimized either by optimizing the block of K samples as a whole as described above or—when the ghost samples are not determined based on the values of the data samples—by separately precoding the Kd data samples according to the following embodiment. In this embodiment, the K0 consecutive samples between the first position J1 and the second position J2 being ghost samples, the values of at least part of the Kd data samples are determined so as to compensate for the contribution, occurring upon demodulation of the hybrid symbol, of the K0 ghost samples to the data section of the hybrid symbol.

In another embodiment, the data section of the hybrid symbol, being obtained from applying a DFT-spread-OFDM-type scheme to the block of K samples comprising Kd precoded data samples and K0 consecutive ghost samples is substantially the same as if applying the same DFT-spread-OFDM-type scheme to a block comprising Kd non-precoded data samples ($A_0; \ldots; A_{J1-1}; A_{J2+1}; \ldots; A_{K-1}$) and K0 consecutive samples ($A_{J1}; \ldots; A_{J2}$) which values are set to zero.

Therefore, before modulation, the Kd data samples are precoded to compensate for the contribution of the K0 samples after modulation, such that in the hybrid symbol, the data section corresponds to the Kd data samples to be transmitted, with the precoding canceling out the degradation induced by applying the DFT-spread-OFDM-type scheme.

In an embodiment, J1, J2, T1 and T2 are defined with respect to each other such as:

$$J1 = \text{floor}\left(T1 \times \frac{K}{N}\right) - w_1 \text{ and } J2 = \text{ceil}\left(T2 \times \frac{K}{N}\right) + w_2,$$

wherein each of $w_1$ and $w_2$ is a non-negative integer.

Therefore, it is ensured that none of the Kd data samples to be transmitted are erased after modulation during setting the values of the Sn symbols for each of n=[T1; T2] to zero. Moreover, each positive increment by one of the values of $w_1$ or of $w_2$ provides one additional degree of freedom when determining ghost pilots.

A further aspect of the invention relates to a method for determining a channel estimate of a propagation channel used for transmitting a radio signal emitted with respect to the method as described previously, transmitted through the propagation channel and received by a receiver configured for being active on at least a number of K different sub-carriers, K being a strictly positive integer, the method comprising:
  obtaining, based on the received radio signal, a signal comprising N samples forming a hybrid symbol appended with G samples forming a cyclic prefix of at least part of the hybrid symbol,
  obtaining a first position T1 and a second position T2 in the signal, with T2−T1=R, R being a strictly positive integer, and R=S+L, with L being a positive or null integer, S being a strictly positive integer, such that:
    for each of n=[0; T1−1]∪[T2+1; N−1], the signal comprises a complex sample $S_n$, the complex samples forming a data section of the hybrid symbol;
    for each of n=[T1+L; T2], the signal comprises a reference sample $RS_n$, the reference samples forming a reference section of the hybrid symbol;
  and determining the channel estimate of the propagation channel used for transmitting the received radio signal based at least on the reference section of the hybrid symbol.

The received signal is the observation of the emitted signal after its transmission over the propagation channel. After transmission, the received signal is affected by different degradations such as attenuation, Doppler shift, phase noise, additive noise and inter-symbol interference (ISI) due to the multipath delay spread.

The reference section of the hybrid symbol in the received signal enables determining the channel estimate, which itself may be used for mitigating the impact of ISI, e.g. using an equalizer.

The thusly determined channel estimate may be used for demodulating the received radio signal, particularly for demodulating the data section of the hybrid symbol, but also other data-only symbols.

Determining the channel estimate based at least on the reference section of the hybrid symbol may be performed by any channel estimation method.

A simple channel estimation method comprises applying an inverse OFDM-type scheme to the hybrid symbol to obtain an inverse OFDM-type demodulated signal indicative of the channel estimate of the propagation channel used for transmitting the received radio signal, smoothing and interpolating in frequency said demodulated signal using for example minimum mean square estimators (MMSE) using the knowledge of the transmitted reference samples to reduce noise indicative of multipath delay spread, and determining the channel estimate based on said smoothed signal.

In an alternate embodiment, determining the channel estimate based at least on the reference section of the hybrid symbol comprises:
  setting the values of the complex samples $S_n$ and of the samples forming the cyclic prefix of at least part of the hybrid symbol to zero to obtain an updated signal comprising S reference samples $RS_n$;
  applying an inverse DFT-spread-OFDM-type scheme to the updated signal to obtain an inverse DFT-spread-OFDM-type demodulated signal comprising a block of consecutive reference samples indicative of the channel estimate of the propagation channel used for transmitting the received radio signal; and
  determining the channel estimate based on the demodulated signal.

A further aspect of the invention concerns a telecommunication device, comprising a module for transmitting at least a group of Kd data samples in a radio signal to be transmitted over a communication system, the module comprising an emitter configured for transmitting on at least a number of K different sub-carriers, K and Kd being strictly positive integers, Kd being strictly smaller than K, the telecommunication device further comprising a processing circuit to generate said radio signal, by:
  determining a first position J1 and a second position J2 in a block of K samples ($A_0; \ldots; A_{K-1}$), such that the block of K samples comprises:
    Kd data samples to be transmitted;
    and K0 consecutive samples ($A_{J1}; \ldots; A_{J2}$);
    with J2−J1+1=K0 and Kd+K0=K;
  applying a DFT-spread-OFDM-type scheme to the block of K samples A=($A_0; \ldots; A_{K-1}$), and obtaining an output signal representing a symbol comprising N complex samples $S_n$ in the radio signal, with n=0 to N−1;
  determining, in the output signal, a first position T1 and a second position T2 based on J1, J2, K and N such that: T2−T1=R, with R being a strictly positive integer;
  setting, in the output signal, the values of the R complex samples ($S_{T1}; \ldots; S_{T2}$) between the first position T1 and the second position T2 to zero to obtain an updated output signal;
  inserting, between the first position T1 and the second position T2 of the updated output signal, S reference samples, S being a strictly positive integer and R=S+L, with L being a positive or null integer, to obtain a subsequent signal representing a hybrid symbol comprising:
    for each of n=[0; T1−1] ∪ [T2+1; N−1], a complex sample $S_n$ in the radio signal, the complex samples forming a data section of the hybrid symbol;

for each of n=[T1+L; T2], a reference sample $RS_n$ in the radio signal, the reference samples forming a reference section of the hybrid symbol;

appending, to the hybrid symbol, a cyclic prefix of at least part of the hybrid symbol to obtain a signal representing the hybrid symbol appended with the cyclic prefix; and generating the radio signal corresponding to the signal representing the hybrid symbol appended with the cyclic prefix, in view of transmitting said radio signal.

A further aspect of the invention concerns a telecommunication device, comprising a module for receiving at least a group of Kd data samples in a radio signal to be transmitted over a communication system, the module being configured for operating on at least a number of K different sub-carriers, K and Kd being strictly positive integers, Kd being strictly smaller than K, the telecommunication device further comprising a processing circuit to determine a channel estimate of a propagation channel used for transmitting the radio signal to the telecommunication device, where it is received as a received radio signal, by:

obtaining, based on the received radio signal, a signal comprising N samples forming a hybrid symbol appended with G samples forming a cyclic prefix of at least part of the hybrid symbol, with N and G being strictly positive integers, obtaining a first position T1 and a second position T2 in the signal, with T2−T1=R, R being a strictly positive integer, and R=S+L, with L being a positive or null integer and S being a strictly positive integer, such that:
for each of n=[0; T1−1] U [T2+1; N−1], the signal comprises a complex sample $S_n$, the complex samples forming a data section of the hybrid symbol;
for each of n=[T1+L; T2], the signal comprises a reference sample $RS_n$, the reference samples forming a reference section of the hybrid symbol;

setting the values of the complex samples $S_n$ and of the samples forming the cyclic prefix of at least part of the hybrid symbol to zero to obtain an updated signal comprising S reference samples $RS_n$;

applying an inverse OFDM-type scheme to the updated signal to obtain a demodulated signal comprising a block of consecutive reference samples indicative of the channel estimate of the propagation channel used for transmitting the radio signal.

Such transmission devices, in a non-limiting embodiment, are illustrated on FIG. 3.

Referring to FIG. 3, there is shown a transmitter 3.1 transmitting a radio signal to a receiver 3.2. The receiver 3.2 is in the coverage of the transmitter 3.1. This transmission is a DFT-spread-OFDM-type transmission in the context of OFDM based systems. In this example the transmitter 3.1 is a fixed station and the receiver 3.2 is a mobile terminal, in the context of the 3GPP cellular system they would be named a base station and a user equipment. The transmitter 3.1 can as well be the mobile terminal and the receiver 3.2 a fixed station.

The transmitter 3.1 comprises one communication module (COM_trans) 3.3, one processing module (PROC_trans) 3.4 and a memory unit (MEMO_trans) 3.5. The MEMO_trans 3.5 comprises a non-volatile unit which retrieves the computer program and a volatile unit which retrieves symbol incorporation parameters. The PROC_trans 3.4 is configured to transmit the hybrid symbol according to the invention. The COM_trans 3.3 is configured to transmit to the receiver 3.2 the radio signal. The communication module 3.3, the processing module 3.4 and the memory unit 3.5 may constitute the device for transmitting the hybrid symbol, as previously described.

The receiver 3.2 comprises one communication module (COM_recei) 3.6, one processing module (PROC_recei) 3.7 and a memory unit (MEMO_recei) 3.8. The MEMO_recei 3.8 comprises a non-volatile unit which retrieves the computer program. The PROC_recei 3.7 is configured to retrieve the symbols from the radio signal. The COM_recei 3.6 is configured to receive from the transmitter 3.1 the radio signal.

A further aspect of the invention concerns a computer program product comprising code instructions to perform the method as described previously when said instructions are run by a processor.

A general algorithm of such computer program product, in a non-limiting embodiment, is represented on FIG. 2, as detailed below.

The present invention is illustrated by way of example, and not by way of limitations, in the figures of the accompanying drawings, in which like reference numerals refer to similar elements.

DESCRIPTION OF EMBODIMENTS

Figure 1:
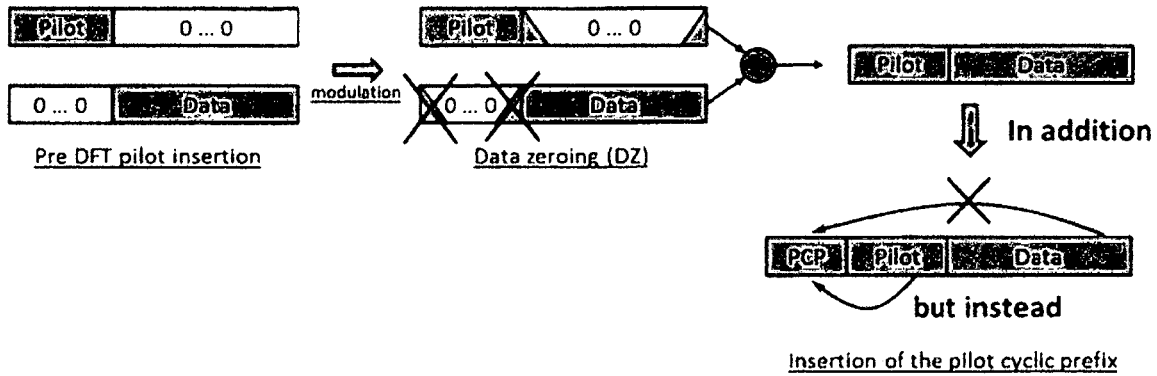
FIG. 1 illustrates the generation of a TDMPi reference symbol.
Figure 2:
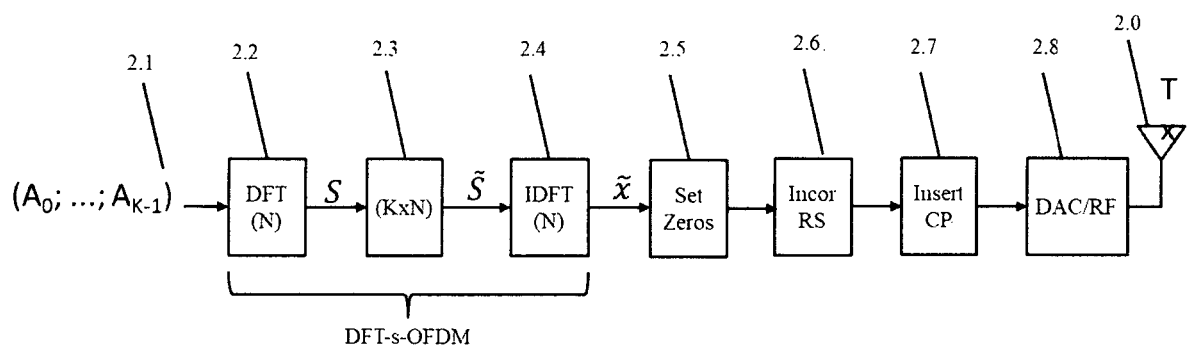
FIG. 2 designates a block diagram of a general algorithm of a program for performing a method according to an embodiment of the invention.

With reference to FIG. 2, a block of K samples ($A_0, \ldots A_{K-1}$) 2.1 is obtained. A first position J1 and a second position J2 in the block of samples are also obtained such that the block of K samples comprises Kd data samples to be transmitted and K0 consecutive samples not to be transmitted ($A_{J1}; \ldots; A_{J2}$).

A K-size Discrete Fourier Transform (DFT) module 2.2 is applied to the block of K samples to obtain K complex samples in the frequency domain. That is, one complex sample is obtained for each l-th sub-carrier among K allocated sub-carriers.

These complex samples are mapped, with a sub-carrier mapping module (K×N) 2.3 in the frequency domain to K out of N inputs of a N-size IDFT module 2.4. Regarding the sub-carrier mapping, the vector of complex samples $S=(S_l)_{l \in [[0;K-1]]}$ is mapped to the K allocated sub-carriers out of N existing sub-carriers via sub-carrier mapping module 2.3. The sub-carrier mapping can be for example localized, that is, the K elements of the vector S are mapped to K consecutive sub-carriers among the N existing. The sub-carrier mapping can be for example distributed, that is the K elements of the vector S are mapped equally distanced over the entire bandwidth with zeros occupying unused sub-carriers.

N-size inverse DFT module 2.4 is then applied to the resulting vector of the sub-carrier mapping module 2.3, therefore generating a DFT-spread-OFDM symbol which is transmitted via the transmit antenna 2.0. More precisely, at the output of the IDFT module 2.4 a signal $\tilde{x}=(\tilde{x}_0, \ldots, \tilde{x}_{N-1})$ is obtained. This signal occupies during a time interval corresponding to a DFT-spread-OFDM symbol, K allocated sub-carriers out of the N existing sub-carriers. The signal $\tilde{x}$ is a time-domain signal whose frequency-domain representation, during the time interval, are the complex samples $S_l$ for each l-th occupied sub-carrier with l=0 to M−1. This time-domain signal $\tilde{x}$ corresponds to a DFT-spread-OFDM symbol. Therefore, samples in the signal $\tilde{x}$ refer to samples in a DFT-spread-OFDM symbol.

At the output of the IDFT module 2.4, the output signal is obtained, representing a DFT-spread-OFDM symbol comprising N complex samples $S_n$ in the radio signal, with n=0 to N−1.

Figure 3:
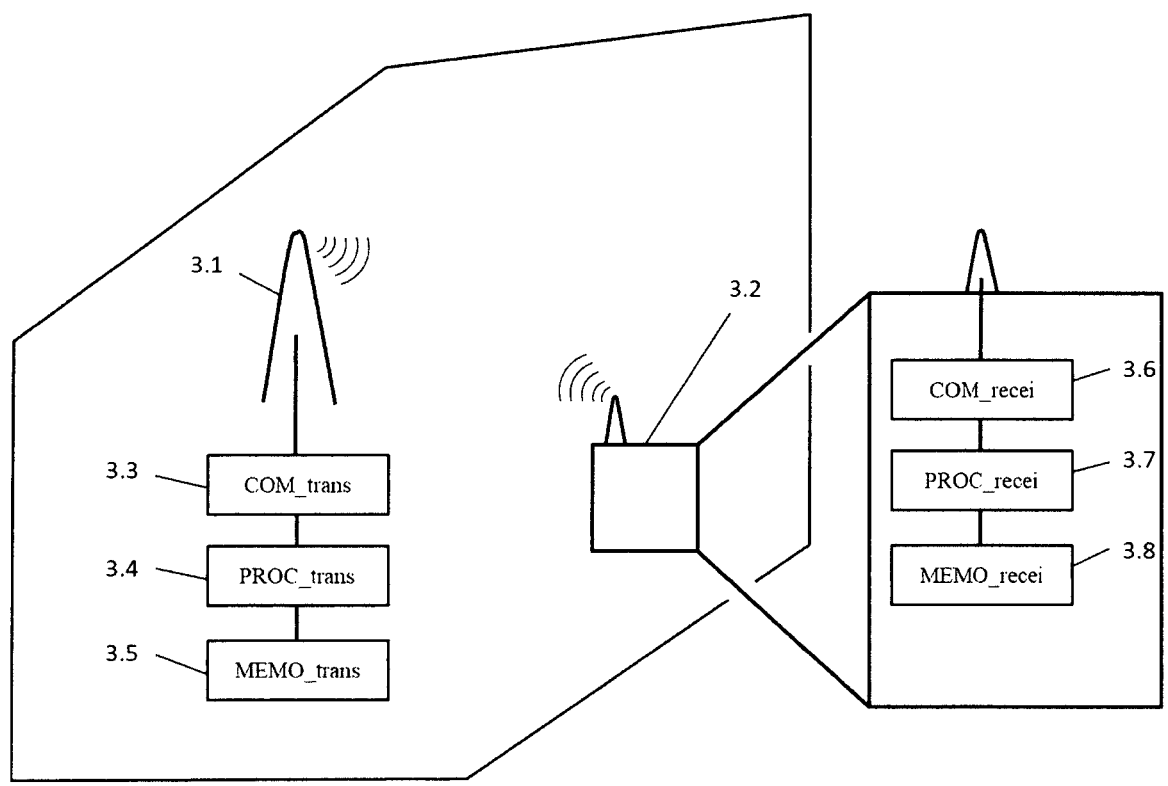
FIG. 3 illustrates telecommunication devices according to embodiments of the invention.

With reference to FIG. 3, the proposed hybrid symbol is obtained by inserting an OFDM reference symbol within the DFT-spread-OFDM symbol of the output signal.

The advantage of inserting a true OFDM reference symbol including its own CP is to benefit from an accurate estimation of the channel using any of the several available OFDM channel estimation techniques. It is assumed here that the DFT-spread-OFDM symbol carries K time-domain samples oversampled by a factor N/K with the addition of P null sub-carriers on both edges of the multiplex (N=2P+K). The size of the OFDM pilot symbol to be inserted in the DFT-spread-OFDM reference symbol is defined according to the requirement of the channel in terms of coherence bandwidth. The OFDM pilot can be inserted in whatever position within the DFT-spread-OFDM reference symbol. The OFDM pilot is inserted by first zeroing the corresponding samples in the previously generated DFT-spread-OFDM reference symbol.

To do so, the output signal is transmitted to a data zeroing module 2.5 having access to a value of a first position T1 in the output signal and of a second position T2 in the output signal, the values of T1 and T2 being determined based on J1, J2, K and N. The output signal thus comprises N complex samples, forming:

a front part of N1 complex samples ($S_0; \ldots; S_{T1-1}$),
a central part of R complex samples ($S_{T1}; \ldots; S_{T2}$),
and a rear part of N2 complex samples ($S_{T2+1}, \ldots; S_{N-1}$).

At the output of the data zeroing module 2.5, the values of the R complex samples in the central part of the output signal are set to zero, resulting in an updated output signal.

The updated output signal is transmitted to a pilot incorporation module 2.6 which incorporates an OFDM pilot appended with its own cyclic prefix. The pilot incorporation module 2.6 has access to the first position T1 and the second position T2 such that the OFDM pilot and the cyclic prefix are inserted from the first position T1 to the second position T2. At the output of the pilot incorporation module 2.6, a subsequent signal is obtained, representing a hybrid symbol.

A cyclic prefix appending module 2.7 appends to the hybrid symbol a cyclic prefix of the hybrid symbol, then the signal may be converted using a Digital-to-Analog Converter module (DAC/RF) 2.8 to generate a radio signal to be transmitted by the antenna 2.0. In particular, the digitally processed signal cannot be emitted as such in the air because of the propagation conditions of the electromagnetic signal and the telecommunications regulations in force. The DAC/RF module overcomes this disadvantage by performing a frequency transposition of the signal.

The generation of the proposed hybrid symbol is further detailed in the embodiments below.

As explained before, the TDMPi reference symbol is particularly well suited for contexts such as satellite transmissions where a key requirement is to minimize the insertion of reference symbols to save at most power at the satellite while keeping low the PAPR. This is the main reason for replacing the normal CP by the pilot CP instead of devoting specific samples for building a dedicated CP for the pilot pattern. As a side effect, the receiver may lack of information for demodulating the last samples in the symbols in case the FFT demodulation window is positioned a few samples back in CP. Moreover, unlike for a global CP, there is no amplitude continuity at the junction between the end of the PCP and the beginning of the DFT-spread-OFDM symbol. This is source of out-of-band (OOB) radiations that may be reduced by filtering but at the expense of a degradation of the circularity for the small OFDM symbol. A solution would be to add reference samples at the end of the symbol but at the cost of additional performance degradations.

The proposed hybrid symbol compensates for the limitations of the TDMPi scheme. The basic principle of the proposed hybrid symbol is, in an embodiment, to insert a true OFDM symbol within a DFT-spread-OFDM symbol. The advantage of inserting a true OFDM reference symbol including its own CP is to benefit from an accurate estimation of the channel using any of the several available OFDM channel estimation techniques. It is assumed here that the DFT-spread-OFDM symbols carry K time-domain samples oversampled by a factor N/K with the addition of P null sub-carriers on both edges of the multiplex. The size of the OFDM pilot, symbol to be inserted in the DFT-spread-OFDM reference symbol is defined according to the requirement of the channel in terms of coherence bandwidth. The OFDM pilot can be inserted in whatever position within the DFT-spread-OFDM reference symbol. The OFDM pilot is implicitly inserted by first zeroing the corresponding samples in the previously generated DFT-spread-OFDM reference symbol.

It is obvious that the erasure of the original samples carrying information data degrades their demodulation.

Figure 4:
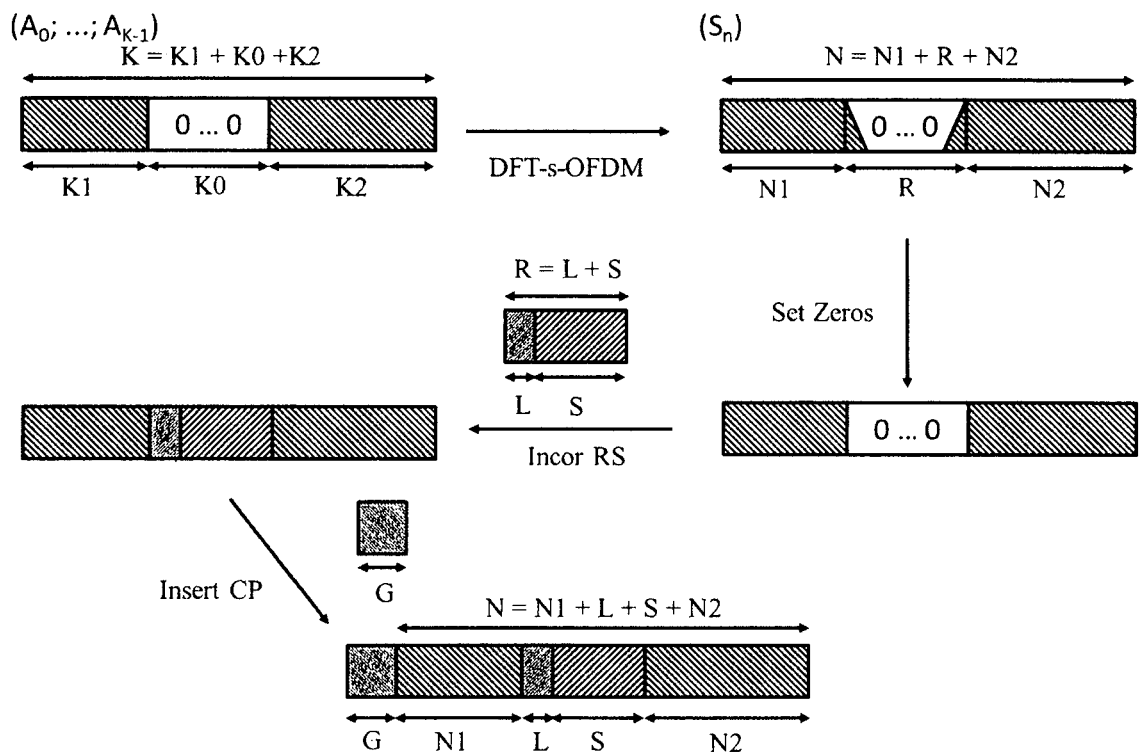
FIG. 4 designates a flowchart illustrating the generation of a hybrid symbol according to a first embodiment of the invention.

Referring to FIG. 4, in an embodiment, a solution is to generate the DFT-spread-OFDM reference symbol with a vector containing zeros at the indices corresponding to the positions of the OFDM pilot. After modulation, the portion of signal corresponding to the positions of the zeros prior modulation would contain a contribution from the data adjacent to the zeros due to the circular convolution with the Dirichlet kernel. This contribution is first zeroed to enable for the insertion of the samples of the OFDM pilot symbol.

As explained before, the portion of signal corresponding to the positions of the zeros prior modulation contains a contribution from the data adjacent to the zeros. Applying the zeroing operation on these samples naturally breaks the orthogonality of the underlying OFDM signal, leading to some degradations on the demodulated data, especially for those close to the zero samples.

Figure 5:
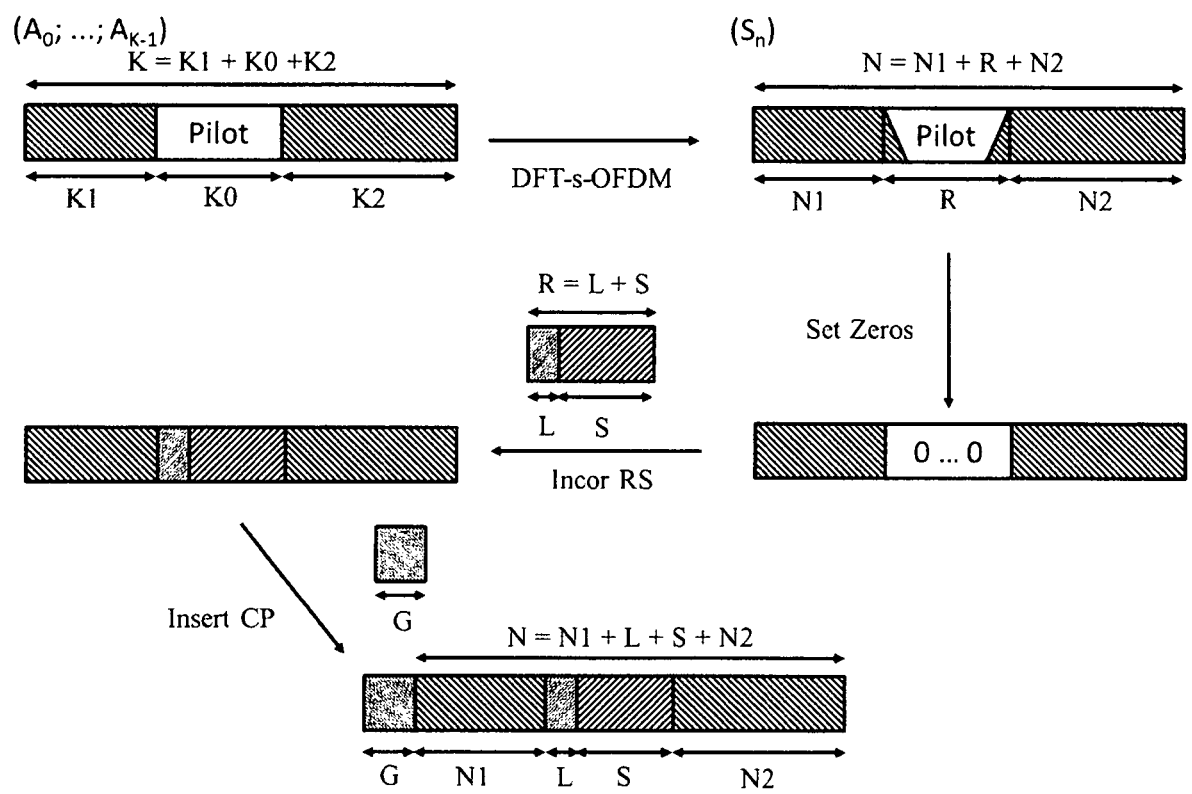
FIG. 5 designates a flowchart illustrating the generation of a hybrid symbol according to a second embodiment of the invention.

Referring to FIG. 5, in an embodiment, it is proposed to insert pilot samples before modulation computed so as to reduce as much as possible the contribution of data onto the central part after modulation. As the contribution of these pilot samples will be mostly cancelled by the zeroing operation, they will be described in this document as so-called ghost samples of a ghost pilot type or ghost pilots or ghost pilot samples.

The OFDM pilot is made of S samples extended with a CP with length L leading to a total number of samples R=S+L. Let's assume that the OFDM pilot is inserted at the index T1 in the DFT-spread-OFDM reference symbol with length N assuming a numbering in [0, N−1]. The last sample of the OFDM pilot is thus inserted at the index T2=T1+R−1. The index of the first and last samples carrying a pilot sample before modulation are defined as:

$$J1 = \text{floor}\left(T1 \times \frac{K}{N}\right) - w_1 \text{ and } J2 = \text{ceil}\left(T2 \times \frac{K}{N}\right) + w_2,$$

where the floor( ) function is the function that takes as input a real number x and gives as output the greatest integer less than or equal to x, the ceil( ) function is the function that gives as output the least integer greater than or equal to x and w1 and w2 are positive integers, generally small (from 0 to 1 or 2) to limit the loss in spectral efficiency. Note that in the situations where the first or last sample of the inserted OFDM pilot falls very close to a data position, it is better to set w1 at least to one. As a result, the original vector is divided into 3 parts:

a front part: K1=J1 information data, indices [0, J1−1]
a central part: K0=J2−J1+1 pilot samples, indices [J1, J2]
and a rear part: K2=K−K1−K0 information data, indices [J2+1,K−1]

The total number of data carried out by the front and rear parts in the original vector is denoted as Kd=K1+K2.

The samples carried within the front and rear parts are denoted as information or user or useful data. After DFT-spread-OFDM modulation, the central part mostly depends on the inserted pilot samples but also contains a contribution of the data due to the circular convolution of the front and rear samples with the Dirichlet kernel. Prior insertion of the OFDM pilot, the signal is decomposed into 3 parts:

a front part: N1=T1 data samples left unchanged, indices [0, T1−1]
a central part: N0=R samples forced to zero, indices [T1, T2]
and a rear part: N2=N−N1−N0 data samples left unchanged, indices [T2+1, N−1].

Finally, the OFDM pilot with length R generated according to any method guarantying a low PAPR is inserted at the places occupied by the R pilots. A typical but not restrictive solution are the so-called Zadoff-Chu sequences as used in the uplink of the 3GPP/LTE cellular system. The total number of data carried out by the front and rear parts in the modulated signal is denoted as Nd=N1+N2.

The proposed algorithm is best introduced using a matrix description of the DFT-spread-OFDM modulation. In a first step, the modulation and the demodulation are both described as matrix transformations to serve as a reference for the rest of the description. $x_k$ designate the data (information) samples which are parsed into data blocks x with size K. The i-th data block $x^{(i)}$ can thus be written as: $x^{(i)}=[x_0^{(i)}, \ldots, x_{K-1}^{(i)}]$.

The contribution of the data to the overall signal is detailed below. Data blocks $x^{(i)}$ are first spread in frequency using a K-point normalized direct form Discrete Fourier Transform (DFT) that can be described as a matrix product using: $A=P_c F_K$, where $P_c$ is the (K,K) permutation matrix that swaps the halves of each column of the matrix it is applied to, and where $F_K$ is the K-point normalized Discrete Fourier Transform (DFT) under the form of a (K,K) matrix with elements $F_{k,n}=\omega_K^{kn}/\sqrt{K}$ on the k-th row and n-th column, where k,n=0 . . . K−1,$\omega_K$=exp(j2π/K) being a primitive root of unity. After spreading and addition of the null sub-carriers, the samples are OFDM modulated using the matrix: $B=P_r F_N^H \times \sqrt{N/K}$, where $P_r$ is a (N,N) permutation matrix that swaps the halves of each row of the matrix it is applied to and where $K_N^H$ is the N-point normalized Inverse Discrete Fourier Transform (IDFT). In this matrix, only the contribution of the spread data is kept, ignoring the null sub-carriers:

*Bm=B*(:,ModSubCarrierMask), where ModSubCarrierMask corresponds to the vector of indices with length N of the K modulated sub-carriers in the multiplex.

Finally, the generated signal can be computed using the (N, K) matrix:

*C=BmA.*

The generated signal is given by: $y^{(i)}=Cx^{(i)}$.

For the sake of simplicity, the reference to the rank (i) of the symbol is ignored in the rest of the document. At the receiver, the signal is first OFDM demodulated using the matrix: $D=P_c F_N \times \sqrt{K/N}$. In this matrix, only the contribution of the modulated sub-carriers is kept:

*Dm=D*(ModSubCarrierMask,:).

A perfect channel estimation is assumed, with an ideal Zero Forcing equalization and no additive noise. (Extension to more relevant equalization is straightforward). After equalization using the result of the channel estimation, the demodulated samples are despread using the matrix: $E=P_r F_K^H$.

Overall, the samples are demodulated by the (K,N) matrix: F=E Dm.

The contribution of the zeroing operation to the demodulation of the useful data is described thereafter. Again, a perfect channel estimation is assumed, with an ideal Zero Forcing equalization and no additive noise. The contribution of the useful data on the front and rear parts of the generated signal is computed. Let's first consider the spreading operation that is computed using the matrix A as described above in taking into account both the useful data samples and the ghost pilots. After spreading and addition of the null sub-carriers, the samples are OFDM modulated using the matrix Bm where only the samples of the front and rear parts are kept:

*Bdm=B*(DataPosMaskAfter,ModSubCarrierMask), where DataPosMaskAfter corresponds to the vector of indices with length N of the Nd useful front and rear parts in the generated signal. Overall, the contribution of the original vector to the front and rear parts of the generated signal is obtained from the (Nd, K) matrix: Cd=Bdm A.

At the receiver, the signal is first OFDM demodulated using the matrix Dm where only the contribution of the front and rear parts is kept (the central part is zeroed):

*Dmd=D*(ModSubCarrierMask,DataPosMaskAfter).

After equalization using the result of the channel estimation, the demodulated samples are despread using the matrix E where only the result for the rear and front parts of the demodulated vector is kept:

*Ed=E*(DataPosMaskBefore,:).

The demodulation is thus performed using the matrix: Fz=Ed Dmd.

Overall, the result of the demodulation of the useful data with application of the zeroing application is thus computed using the (Kd,K) matrix: Gz=Fz Cd.

The generation of the ghost pilots, in an embodiment, for reducing the data contribution onto the central part is detailed thereafter. The purpose is to compute the vector of pilot samples that cancels or at least reduces the data contribution onto the central part.

$s_k$ designate the pilot samples of the short OFDM symbol inserted after modulation at the positions of the zeroed samples. The short OFDM pilot is described as the following vector with length R:$s=[s_0, \ldots, s_{R-1}]^T$.

$p_k$ designate the ghost pilot samples populating the central part of the vector x prior modulation. The ghost pilot is described as the following vector with length K0: $p=[p_0, \ldots, p_{K0-1}]^T$.

Finally, for convenience, the set of information data is denoted by $d_k$ and grouped as a single vector with length Kd: $d=[d_0, \ldots, d_{Kd-1}]^T$.

The contribution of the useful data on the central part of the generated signal is described thereafter. The spreading operation computed using the matrix A takes into account only the useful data:

$$Ad=A(:,DataPosMaskBefore),$$

where DataPosMaskBefore corresponds to the vector of indices with length K of the Kd useful data within the data blocks x. After spreading and addition of the null sub-carriers, the samples are OFDM modulated using the matrix Bm, where only the samples of the central part are kept:

$$Bpm=B(PilotPosMaskAfter,ModSubCarrierMask),$$

where PilotPosMaskAfter corresponds to the vector of indices of the R samples of the central part in the generated signal. Overall, the contribution of the front and rear parts of the original vector to the central part of the generated signal is obtained from the (R, Kd) matrix:Cpd=Bpm Ad.

Similarly, the contribution of the ghost pilots on the central part of the generated signal is computed. The spreading operation that is computed using the matrix A takes into account only the ghost pilots populating the central part:

$$Ap=A(:,PilotPosMaskBefore),$$

where PilotPosMaskBefore corresponds to the vector of indices with length K0 of the ghost pilot samples within the data blocks x. After spreading and addition of the null sub-carriers, the samples are OFDM modulated using the matrix Bpm. Overall, the contribution of the ghost pilots of the original vector to the central part of the generated signal is obtained from the (R, K0) matrix: Cpp=Bpm Ap. The set of ghost pilot samples is obtained as the solution of the following linear system: Cpp p=−Cpd d.

As the (N0,K0) matrix $C_{pp}$ is full rank and has more rows than columns, the corresponding system has no exact solution. It is common in such a case, to compute the least-squares solution:

$$\min_p \|Cppp + Cpdd\|_2^2.$$

Experiments show that the error is in general small and the vector obtained as such reduces the impact of the zeroing operation onto the decoded data. It is also possible to reduce the number of points for which the cancellation of the data contribution is enforced but also the number of ghost pilots used to achieve that goal. Without losing in generality, it is assumed that the ghost pilots are located on both sides of the central part with an equal number of samples Kb. Similarly, the samples to be cancelled out are located on both sides of the central part with an equal number of samples Ka. Two cases can be met:

Ka≥Kb: Again, the system is overdetermined and only a least-square solution can be computed. The advantage of this approach is to reduce the computational cost. In addition to the residual error, the demodulation of the data can be degraded due to the zeroing applied to the remaining data contribution in the middle of the central part (and not reduced using the ghost samples). This impact is in general small as the data contribution amplitude is decreasing when moving away from the front and rear data parts.

Ka≤Kb: In this case, the system is underdetermined and several solutions exist. It is common to select the one with the least-square amplitude. In this case, it is possible to strictly enforce the zeroing. However, as the system has potentially several degrees of freedom, the system can lead to solutions where the ghost pilot samples located in the middle of the central part show a very large amplitude. This can lead to a degradation of the PAPR. An alternative is then to solve the system with a constraint on the amplitude of the pilot, but at the price of a residual error.

In order to obtain a significant reduction of the data contribution, it is preferable to benefit from at least one pilot on each side of the central part prior modulation and not falling in the central part of the generated signal. To do so, the index of the first and last samples carrying a pilot sample, defined as:

$$J1 = \text{floor}\left(T1 \times \frac{K}{N}\right) - w_1, J2 = \text{ceil}\left(T2 \times \frac{K}{N}\right) + w_2,$$

shall be chosen such that $w_1$ and $w_2$ are at least equal to 1. Better results are obtained with 2 pilots on each side, that is, $w_1$ and $w_2$ being at least equal to 2. However, it may occur that the solution found can show a high amplitude specifically for these samples. Again, an alternative is then to solve the system while constraining the amplitude of the pilot.

The application of the ghost pilots for cancelling the data contribution for all or a part of the central part of the generated signal can only result from a tradeoff. Indeed, when reducing the data contribution by inserting pilots in the central part, those pilots are susceptible to spread outside the central part, i.e. onto the data parts. This is not an issue for the demodulation as long as the overall contribution of the pilot is left unchanged. But in the present case, the zeroing operation breaks out the orthogonality of the ghost pilots component. As a result, the demodulated samples can be degraded by a pilot contribution. This is particularly true when the system is underdetermined leading to ghost samples with large amplitude. It shall also be noted that the demodulated data is also degraded by the insertion of the short OFDM pilot.

With reference to FIG. 5, it is proposed in an embodiment to insert ghost pilot samples so as to generate a signal that closely resemble to the short OFDM symbol inserted after zeroing.

Two main advantages from this approach are:
as the signal generated using the ghost pilots closely resembles to the OFDM pilot symbol, the perturbation brought by the zeroing entirely or partially compensates the error due to the insertion of the OFDM pilot after the zeroing;
and introducing ghost pilots so as to obtain a signal that closely resembles to the inserted OFDM signal significantly reduces the amplitude discontinuity after zeroing and insertion of the OFDM pilot, thus reducing the OOB radiations.

The set of ghost pilot samples that mimics the OFDM pilot symbol is obtained as the solution of the following linear system: Cpp p=s−Cpd d.

It can be noticed in the linear system above that the ghost pilots are computed to resemble to the inserted samples after retrieval of the data contribution onto the same samples. This is indeed the overall result of the modulation of both data and pilot samples that builds the shape of the samples that will be replaced by the short OFDM pilot.

As the (N0,K0) matrix $C_{pp}$ is full rank and has more rows than columns, the corresponding system has no exact solution. It is common in such a case, to compute the least-squares solution:

$$\min_p \|Cppp - s + Cpdd\|_2^2.$$

As explained before, it is important to benefit from at least one pilot on each side of the central part prior modulation and not falling in the central part of the generated signal in order to significantly math the inserted samples. However, it may occur that the solution found can show a high amplitude specifically for these two samples. An alternative is then to solve the system with constraining the amplitude of the pilot.

In an embodiment, the ghost samples are simply generated as the result of the demodulation of the inserted OFDM symbol alone or in combination with the data samples.

In an alternative embodiment, an initial value for the ghost pilot samples is set as a vector computed according to the solutions mentioned in the previous embodiment. Then the samples on both sides of the pilot are updated for further reducing the OOB.

The zeroing operation introduces performance degradation at the receiver due to the alteration of the OFDM orthogonality. In another embodiment of the proposed solution, the set of original data samples is updated prior modulation in order to minimize the degradation at the receiver. This update is referred to as data precoding.

In this first case, it is assumed that the pilot samples are simply set to zero. Before the actual generation of the DFT-spread-OFDM symbol, the transmitter updates the data vector so as to compensate at the receiver the impact of the zeroing and the contribution of the pilot samples. The contribution of the pilot samples onto the useful data is computed hereafter. At the receiver, the signal is first OFDM demodulated using the matrix Dm in where we keep only the contribution of the central part $$Dmp=D(ModSubCarrierMask,PilotPosMaskAfter)$$

where PilotPosMaskAftercorresponds to the vector of indices with length N of the R pilot samples in the generated signal. After equalization the demodulated samples are despread using the matrix Ed where we keep only the result for the rear and front parts of the demodulated vector. The result of the demodulation of the OFDM pilot on the positions of the useful data is thus computed using the (Kd,R) matrix: Fp=EdDmp. The precoded data set is obtained as the solution of the following linear system: Gz $d^{updated}=d^{original}$−Fp s where $d^{updated}$ is the set of information data after application of precoding and $d^{original}$ the original set of information data.

In the linear system above, the new vector of data is computed to compensate for the degradation brought by the zeroing operation, but also the one brought by the pilot insertion. This component can also be retrieved at the receiver. As the matrix Gz is full rank, the updated vector of samples can be computed using any appropriate algorithm.

In another embodiment, it is possible to reduce the size of the vector of the updated data for complexity reduction at the expense of a small performance degradation.

The data vector may be updated to compensate for the impact of the ghost pilots and the insertion of the OFDM pilot. In this case, the system is almost similar to the previous one except that it is required to add to the components to be compensated for the contribution of the ghost pilots to the decoded data computed using the matrix: Gzp=Fz Cdp where Cdp=Bdm Ap.

The new data set is obtained as the solution of the following linear system: Gz $d^{updated}=d^{original}$−Fp s−Gzp p.

In an embodiment, the computation of the ghost pilots and the precoded data is jointly achieved for better performance but at the cost of an increased complexity.

It is assumed that Pa ghost samples are inserted on both sides of the central part before modulation (for a total of 2×Pa samples). The ghost samples are computed to achieve the equality with the inserted OFDM pilot for Pb samples on both sides of the central part after modulation (for a total of 2×Pb samples). This operation can be performed alone or in combination with the compensation of the zeroing and pilot insertion. The algorithm is described here in this more general case.

Let's first consider the spreading operation that is computed using the (K, Kd+2×Pa) matrix extracted from A taking into account the useful data and the ghost samples:

$$Ade=A(:,ExtendedDataPosMaskBefore),$$

where ExtendedDataPosMaskBefore corresponds to the vector of indices with length K of the Kd useful data augmented with the 2×Pa ghost samples. After spreading and addition of the null sub-carriers, the samples are OFDM modulated using the (Nd, K) matrix extracted from Bdm. Overall, the contribution of the front and rear parts augmented with the ghost samples of the original vector to the front and rear parts of the generated signal is obtained from the (Nd, Kd+2×Pa) matrix: Cdde=Bdm Ade.

At the receiver, the signal is first OFDM demodulated using the matrix Dmd. After equalization using the result of the channel estimation (a perfect channel estimation is assumed, with an ideal Zero Forcing equalization and no additive noise), the demodulated samples are despread using the (K, K) matrix Ed. The demodulation is thus performed using the (K, Nd) Fz matrix.

Overall, the result of the demodulation of the useful data augmented with the ghost samples taking into account the application of the zeroing application is thus computed using the (Kd, Kd+2×Pa) matrix: Gze=Fz Cdde.

In order to guaranty the amplitude equality, it is first required to compute the contribution of the useful data plus the ghost samples onto the Pb samples on both sides of the central part after modulation. The starting point is the matrix Ade that performs the spreading operation taking into account the useful data augmented with the ghost samples. After spreading and addition of the null sub-carriers, the samples are OFDM modulated using the matrix Bm where only the samples on both edges of the central part are kept:

$$Bpm=B(GhostPosMaskAfter,ModSubCarrierMask),$$

where GhostPosMaskAftercorresponds to the vector of indices with length N of the 2×Pb samples selected on the edges of the central part after modulation for which the equality with the corresponding samples of the inserted OFDM pilot is guaranteed.

Overall, the contribution of the front and rear parts of the original vector augmented with the 2×Pa ghost samples to the edges of the central part after modulation is obtained from the (2×Pb, Kd+2×Pa) matrix: Cedp=Bpm Ade.

s_ denotes the vector of pilot samples for which we want to obtain equality with the corresponding samples obtained after modulation of the updated data and the 2×Pa ghost samples:

$$s_- = [s_0, \ldots, s_{Pb-1}, s_{R-Pb-1}, \ldots, s_{R-1}]^T.$$

x_+ denotes the vector of useful data augmented with the 2×Pa ghost samples:

$$d_+ = [d_0, \ldots, d_{J1-1}, p_0, \ldots, p_{Pa-1}, p_{Pa}, \ldots, p_{K0-Pa+1}, d_{J1}, \ldots, d_{Kd-1}]^T.$$

The updated data and ghost samples are altogether obtained as the solution of the following (Kd+2×Pb, Kd+2×Pa) system:

$$\begin{pmatrix} Gze \\ Cedp \end{pmatrix} d_+ = \begin{pmatrix} d^{original} - Fps \\ s_- \end{pmatrix}.$$

In order to guarantee the existence of at least one solution, it is required to select Pb≤Pa. Just like for the data update operation, it is possible to reduce the number of updated data so as to reduce the computation cost at the expense of some performance degradation.

The invention claimed is:

1. A method for transmitting at least a group of Kd data samples in a radio signal to be transmitted over a communication system, said radio signal being intended to be emitted by an emitter comprising at least one transmission module configured for transmitting on at least a number of K different sub-carriers, K and Kd being strictly positive integers, Kd being strictly smaller than K, said radio signal being provided by:

determining a first position J1 and a second position J2 in a block of K samples ($A_0$; . . . ; $A_{K-1}$), such that the block of K samples comprises:
Kd data samples to be transmitted;
and K0 consecutive samples ($A_{J1}$; . . . ; $A_{J2}$);
with J2−J1+1=K0 and Kd+K0=K;
applying a DFT-spread-OFDM-type scheme to the block of K samples A=($A_0$; . . . ; $A_{K-1}$), and obtaining an output signal representing a symbol comprising N complex samples $S_n$ in the radio signal, with n=0 to N−1;
determining, in the output signal, a first position T1 and a second position T2 based on J1, J2, K and N such that: T2−T1=R, with R being a strictly positive integer;
setting, in the output signal, the values of the R complex samples ($S_{T1}$; . . . ; $S_{T2}$) between the first position T1 and the second position T2 to zero to obtain an updated output signal;
the method being characterized by:
inserting, between the first position T1 and the second position T2 of the updated output signal, S reference samples, S being a strictly positive integer and R=S+L, with L being a positive or null integer, to obtain a subsequent signal representing a hybrid symbol comprising:
for each of n=[0; T1−1]∪[T2+1; N−1], a complex sample $S_n$ in the radio signal, the complex samples forming a data section of the hybrid symbol;
for each of n=[T1+L; T2], a reference sample $RS_n$ in the radio signal, the reference samples forming a reference section of the hybrid symbol;
appending, to the hybrid symbol, G samples forming a cyclic prefix of at least part of the hybrid symbol to obtain a signal representing the hybrid symbol appended with the cyclic prefix; in view of transmitting the radio signal corresponding to the signal representing the hybrid symbol appended with the cyclic prefix.

2. The method according to claim 1, wherein inserting, between the first position T1 and the second position T2 of the updated output signal, S reference samples to obtain the subsequent signal further comprises inserting, between the first position T1 and the second position T2, L cyclic prefix samples such that the subsequent signal comprises:
for each of n=[T1; T1+L−1], a cyclic prefix sample $CPRS_n$ in the radio signal, the cyclic prefix samples forming a cyclic prefix of the reference section of the hybrid symbol.

3. The method according to claim 1, said method further comprising setting the values of the K0 consecutive samples between the first position J1 and the second position J2 in the block of K samples to zero, before applying the DFT-spread-OFDM-type scheme thereto and obtaining the output signal.

4. The method according to claim 1, wherein at least part of the K0 consecutive samples in the block of K samples are obtained by, prior to applying the DFT-spread-OFDM-type scheme to the block of K samples and obtaining the output signal:
(a) obtaining a plurality of temporary blocks of K samples ($A'_0$; . . . ; $A'_{K-1}$), each temporary block of K samples comprising:
the Kd data samples to be transmitted, and
K0 temporary consecutive ghost samples ($A'_{J1}$; . . . ; $A'_{J2}$);
(b) for each temporary block of K samples, determining values of at least part of the R complex samples $S'_n$ for each of n=[T1; T2] to be obtained between the first position T1 and the second position T2 as a result of applying the DFT-spread-OFDM-type scheme to the temporary block of K samples;
(c) for each temporary block of K samples, determining a criterion associated to said temporary block of K samples indicating a level of resemblance between:
said values of at least part of the R complex samples $S'_n$, and
null values; and
(d) determining said at least part of the K0 consecutive samples ($A_{J1}$; . . . ; $A_{J2}$) of the block of K samples based on values of each of said temporary blocks of K samples and on each criterion determined in (c), such that values of at least part of the R complex samples $S_n$ for each of n=[T1; T2] to be obtained between the first position T1 and the second position T2 as a result of applying the DFT-spread-OFDM-type scheme to the block of K samples exhibit an optimized level of resemblance to null values.

5. The method according to claim 4, wherein determining said at least part of the K0 consecutive samples ($A_{J1}$; . . . ; $A_{J2}$) of the block of K samples comprises applying a least squares method.

6. The method according to claim 1, wherein at least part of the K0 consecutive samples ($A_{J1}$; . . . ; $A_{J2}$) in the block of K consecutive samples are ghost samples of a ghost pilot type.

7. The method according to claim 5, wherein the at least part of the K0 consecutive samples ($A_{J1}$; . . . ; $A_{J2}$) in the block of K consecutive samples are determined by, prior to applying the DFT-spread-OFDM-type scheme to the block of K samples and obtaining the output signal:
   obtaining a reference signal comprising the S reference samples to be inserted appended with the L cyclic prefix samples to be inserted,
   applying an inverse DFT-spread-OFDM-type scheme to the reference signal to obtain a demodulated reference signal comprising a block of K demodulated samples comprising K0 consecutive demodulated samples,
   and inserting at least part of the K0 consecutive demodulated samples in the block of K samples as ghost samples of a ghost pilot type forming the at least part of the K0 consecutive samples.

8. The method according to claim 6, wherein the at least part of the K0 consecutive samples ($A_{J1}$; . . . ; $A_{J2}$) in the block of K consecutive samples are determined by, prior to applying the DFT-spread-OFDM-type scheme to the block of K samples and obtaining the output signal:
   (a) obtaining a plurality of temporary hybrid blocks of K samples ($A''_0$; . . . ; $A''_{K-1}$), each temporary hybrid block of K samples comprising:
      the Kd data samples to be transmitted, and
      K0 temporary consecutive ghost samples ($A''_{J1}$; . . . ; $A''_{J2}$) of a ghost pilot type;
   (b) for each temporary block of K samples, determining values of at least part of the R complex samples $S''_n$ for each of n=[T1; T2] to be obtained between the first position T1 and the second position T2 as a result of applying the DFT-spread-OFDM-type scheme to the temporary hybrid block of K samples;
   (c) for each temporary hybrid block of K samples, determining a criterion associated to said temporary hybrid block of K samples indicating a level of resemblance between:
      said values of at least part of the R complex samples $S''_n$, and
      the values of at least part of the S reference samples to be inserted appended with the L cyclic prefix samples to be inserted; and
   (d) determining said at least part of the K0 consecutive samples ($A_{J1}$; . . . ; $A_{J2}$) of the block of K samples based on said temporary hybrid blocks of K samples and on each criterion determined in (c), such that values of at least part of the R complex samples $S_n$ for each of n=[T1; T2] to be obtained between the first position T1 and the second position T2 as a result of applying the DFT-spread-OFDM-type scheme to the block of K samples exhibit an optimized level of resemblance to the values of the at least part of the S reference samples to be inserted appended with the L cyclic prefix samples to be inserted.

9. The method according to claim 8, further comprising:
   (e) obtaining a plurality of temporary block of K samples ($A'_0$; . . . ; $A'_{K-1}$), each temporary block of K samples comprising:
      the Kd data samples to be transmitted, and
      K0 temporary consecutive ghost samples ($A'_{J1}$; . . . ; $A'_{J2}$);
   (f) for each temporary block of K samples, determining values of at least part of the R complex samples $S'_n$ for each of n=[T1; T2] to be obtained between the first position T1 and the second position T2 as a result of applying the DFT-spread-OFDM-type scheme to the temporary block of K samples;
   (g) for each temporary block of K samples, determining a criterion associated to said temporary block of K samples indicating a level of resemblance between:
      said values of at least part of the R complex samples $S'_n$, and
      null values; and
   (h) determining at least part of K0 consecutive samples based on values of each of said temporary blocks of K samples and on each criterion determined in (g), such that values of at least part of the R complex samples $S_n$ for each of n=[T1; T2] to be obtained between the first position T1 and the second position T2 as a result of applying the DFT-spread-OFDM-type scheme to the block of K samples exhibit an optimized level of resemblance to null values;
   (i) based on said at least part of K0 consecutive samples determined in (h), updating said at least part of the K0 consecutive samples ($A_{J1}$; . . . ; $A_{J2}$) of the block of K samples.

10. The method according to claim 4, wherein updating the values of at least part of the K0 consecutive samples of the block of K samples comprises:
   determining a third position J1+Pa1 and a fourth position J2-Pa2 in the block of K samples such that the K0 consecutive samples comprise:
      a front part of Pa1 consecutive samples ($A_{J1}$; . . . ; $A_{J1+Pa1}$);
      a central part ($A_{J1+Pa1+1}$; . . . ; $A_{J2-Pa2-1}$);
      a rear part of Pa2 consecutive samples ($A_{J2-Pa2}$; . . . ; $A_{J2}$),
   Pa1, Pa2 being positive integers and Pa1+Pa2 being strictly inferior to K0,
   and updating the values of the samples of the front part and of the rear part of the K0 consecutive samples.

11. The method according to claim 1, wherein the predetermined reference samples are generated by applying an OFDM-type scheme on a CAZAC sequence.

12. The method according to claim 11, wherein the predetermined reference samples are generated by applying an OFDM-type scheme on a Zadoff-Chu sequence.

13. The method according to claim 1, wherein, the K0 consecutive samples between the first position J1 and the second position J2 being ghost samples, the values of at least part of the Kd data samples are determined so as to compensate for the contribution of the K0 ghost samples to the data section of the hybrid symbol.

14. The method according to claim 1, wherein J1, J2, T1 and T2 are defined with respect to each other such as:

$$J1 = \text{floor}\left(T1 \times \frac{K}{N}\right) - w_1 \text{ and } J2 = \text{ceil}\left(T2 \times \frac{K}{N}\right) + w_2,$$

wherein each of $w_1$ and $w_2$ is a non-negative integer.

15. A method for determining a channel estimate of a propagation channel used for transmitting a radio signal emitted with respect to the method according to claim 1, transmitted through the propagation channel and received by a receiver configured for being active on at least a number of K different sub-carriers, K being a strictly positive integer, the method comprising:

obtaining, based on the received radio signal, a signal comprising N samples forming a hybrid symbol appended with G samples forming a cyclic prefix of at least part of the hybrid symbol, obtaining a first position T1 and a second position T2 in the signal, with T2−T1=R, R being a strictly positive integer, and R=S+L, with L being a positive or null integer and S being a strictly positive integer, such that:
for each of n=[0; T1−1]∪[T2+1; N−1], the signal comprises a complex sample $S_n$, the complex samples forming a data section of the hybrid symbol;
for each of n=[T1+L; T2], the signal comprises a reference sample $RS_n$, the reference samples forming a reference section of the hybrid symbol;

setting the values of the complex samples $S_n$ and of the samples forming the cyclic prefix of at least part of the hybrid symbol to zero to obtain an updated signal comprising S reference samples $RS_n$;

applying an inverse OFDM-type scheme to the updated signal to obtain a demodulated signal comprising a block of consecutive reference samples indicative of the channel estimate of the propagation channel used for transmitting the radio signal, and determining the channel estimate of the propagation channel used for transmitting the received radio signal based at least on the reference section of the hybrid symbol.

16. Computer program product comprising code instructions to perform the method according to claim 1, when said instructions are run by a processor.

17. A telecommunication device, comprising a module for transmitting at least a group of Kd data samples in a radio signal to be transmitted over a communication system, the module comprising an emitter configured for transmitting on at least a number of K different sub-carriers, K and Kd being strictly positive integers, Kd being strictly smaller than K, the telecommunication device further comprising a processing circuit to generate said radio signal, by:
determining a first position J1 and a second position J2 in a block of K samples ($A_0$; ... ; $A_{K−1}$), such that the block of K samples comprises:
Kd data samples to be transmitted;
and K0 consecutive samples ($A_{J1}$; ... ; $A_{J2}$);
with J2−J1+1=K0 and Kd+K0=K;

applying a DFT-spread-OFDM-type scheme to the block of K samples A=($A_0$; ... ; $A_{K−1}$), and obtaining an output signal representing a symbol comprising N complex samples $S_n$ in the radio signal, with n=0 to N−1;

determining, in the output signal, a first position T1 and a second position T2 based on J1, J2, K and N such that:
T2−T1=R, with R being a strictly positive integer;

setting, in the output signal, the values of the R complex samples ($S_{T1}$; ... ; $S_{T2}$) between the first position T1 and the second position T2 to zero to obtain an updated output signal;

the telecommunication device being characterized by: the processing circuit to generate said radio signal, by further inserting, between the first position T1 and the second position T2 of the updated output signal, S reference samples, S being a strictly positive integer and R=S+L, with L being a positive or null integer, to obtain a subsequent signal representing a hybrid symbol comprising:
for each of n=[0; T1−1]∪[T2+1; N−1], a complex sample $S_n$ in the radio signal, the complex samples forming a data section of the hybrid symbol;
for each of n=[T1+L; T2], a reference sample $RS_n$ in the radio signal, the reference samples forming a reference section of the hybrid symbol;

appending, to the hybrid symbol, a cyclic prefix of at least part of the hybrid symbol to obtain a signal representing the hybrid symbol appended with the cyclic prefix; and generating the radio signal corresponding to the signal representing the hybrid symbol appended with the cyclic prefix, in view of transmitting said radio signal.

18. A telecommunication device, comprising a module for receiving at least a group of Kd data samples in a radio signal transmitted over a communication system, the module being configured for operating on at least a number of K different sub-carriers, K and Kd being strictly positive integers, Kd being strictly smaller than K,
the telecommunication device further comprising a processing circuit to determine a channel estimate of a propagation channel used for transmitting the radio signal to the telecommunication device, where it is received as a received radio signal, by:
obtaining, based on the received radio signal, a signal comprising N samples forming a hybrid symbol appended with G samples forming a cyclic prefix of at least part of the hybrid symbol, with N and G being strictly positive integers,
obtaining a first position T1 and a second position T2 in the signal, with T2−T1=R, R being a strictly positive integer, and R=S+L, with L being a positive or null integer and S being a strictly positive integer, such that:
for each of n=[0; T1−1]∪[T2+1; N−1], the signal comprises a complex sample $S_n$, the complex samples forming a data section of the hybrid symbol;
for each of n=[T1+L; T2], the signal comprises a reference sample $RS_n$, the reference samples forming a reference section of the hybrid symbol;

setting the values of the complex samples $S_n$ and of the samples forming the cyclic prefix of at least part of the hybrid symbol to zero to obtain an updated signal comprising S reference samples $RS_n$;
applying an inverse OFDM-type scheme to the updated signal to obtain a demodulated signal comprising a block of consecutive reference samples indicative of the channel estimate of the propagation channel used for transmitting the radio signal.

* * * * *